(12) United States Patent
Akatsu et al.

(10) Patent No.: US 10,591,602 B2
(45) Date of Patent: Mar. 17, 2020

(54) OBJECT DETECTOR AND SENSOR

(71) Applicants: Kazuhiro Akatsu, Ibaraki (JP); Tadashi Nakamura, Tokyo (JP); Kohji Sakai, Tokyo (JP)

(72) Inventors: Kazuhiro Akatsu, Ibaraki (JP); Tadashi Nakamura, Tokyo (JP); Kohji Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/384,629

(22) Filed: Apr. 15, 2019

(65) Prior Publication Data

US 2019/0242997 A1 Aug. 8, 2019

Related U.S. Application Data

(63) Continuation of application No. 15/729,324, filed on Oct. 10, 2017, now Pat. No. 10,302,767, which is a (Continued)

(30) Foreign Application Priority Data

Dec. 6, 2013 (JP) .................................. 2013-252683
Jan. 10, 2014 (JP) .................................. 2014-002813

(51) Int. Cl.
*G01S 17/42* (2006.01)
*G01S 7/486* (2020.01)
(Continued)

(52) U.S. Cl.
CPC .............. *G01S 17/42* (2013.01); *G01S 7/484* (2013.01); *G01S 7/4815* (2013.01);
(Continued)

(58) Field of Classification Search
CPC .......... G01S 17/42; G01S 7/51; G01S 7/4868; G01S 7/484; G01S 7/4815; G01S 17/936; H05B 37/0227
(Continued)

(56) References Cited

U.S. PATENT DOCUMENTS 5,864,391 A 1/1999 Hosokawa et al.
5,923,427 A 7/1999 Dong
(Continued)

FOREIGN PATENT DOCUMENTS

EP 2 687865 1/2014
JP 05-150045 6/1993
(Continued)

OTHER PUBLICATIONS

Office Action issued in Japanese Patent Application No. 2014-002813 on Nov. 15, 2017 Additional References sheet(s) attached.

*Primary Examiner* — Seung C Sohn
(74) *Attorney, Agent, or Firm* — Oblon, McClelland, Maier & Neustadt, L.L.P.

(57) ABSTRACT

An object detector includes a projector including a light source having a two-dimensionally arranged plurality of light emitter groups, each of the light emitter groups having a plurality of light emitters, a light receiver which receives light emitted from the projector, and reflected by an object, and a light source driver which lights on and lights off each of the light emitter groups of the light source.

20 Claims, 26 Drawing Sheets

Related U.S. Application Data continuation of application No. 15/371,650, filed on Dec. 7, 2016, now Pat. No. 9,817,123, which is a continuation of application No. 14/554,498, filed on Nov. 26, 2014, now Pat. No. 9,568,605.

(51) Int. Cl.
*H05B 37/02* (2006.01)
*G01S 17/93* (2020.01)
*G01S 7/481* (2006.01)
*G01S 7/484* (2006.01)
*G01S 7/51* (2006.01)

(52) U.S. Cl.
CPC .............. *G01S 7/4868* (2013.01); *G01S 7/51* (2013.01); *G01S 17/936* (2013.01); *H05B 37/0227* (2013.01)

(58) Field of Classification Search
USPC .................................................. 250/221, 205
See application file for complete search history.

(56) References Cited

U.S. PATENT DOCUMENTS

| | | | |
|---|---|---|---|
| 6,810,330 B2* | 10/2004 | Matsuura | G01S 7/4802 340/435 |
| 7,002,669 B2 | 2/2006 | Frick | |
| 7,544,945 B2* | 6/2009 | Tan | G01S 7/4811 180/169 |
| 7,645,974 B2 | 1/2010 | Ikeno | |
| 8,692,980 B2 | 4/2014 | Gilliland | |
| 8,964,168 B1 | 2/2015 | Hunt | |
| 2007/0076186 A1 | 4/2007 | Miyazaki et al. | |
| 2014/0009747 A1 | 1/2014 | Suzuki et al. | |
| 2014/0034817 A1 | 2/2014 | Nakamura et al. | |
| 2014/0036071 A1 | 2/2014 | Nakamura et al. | |
| 2014/0160460 A1 | 6/2014 | Gilliland | |
| 2014/0209793 A1 | 7/2014 | Nakamura et al. | |
| 2014/0350836 A1 | 11/2014 | Stettner | |

FOREIGN PATENT DOCUMENTS

| | | |
|---|---|---|
| JP | 6-74763 A | 3/1994 |
| JP | 09-274076 | 10/1997 |
| JP | 10-147197 A | 6/1998 |
| JP | 2003-158332 A | 5/2003 |
| JP | 2004-247461 A | 9/2004 |
| JP | 2007-101342 A | 4/2007 |
| JP | 2009-204691 A | 9/2009 |
| JP | 2014-020889 | 2/2014 |
| JP | 2014-029317 | 2/2014 |
| JP | 2014-032149 | 2/2014 |
| JP | 2014-145744 | 8/2014 |

\* cited by examiner

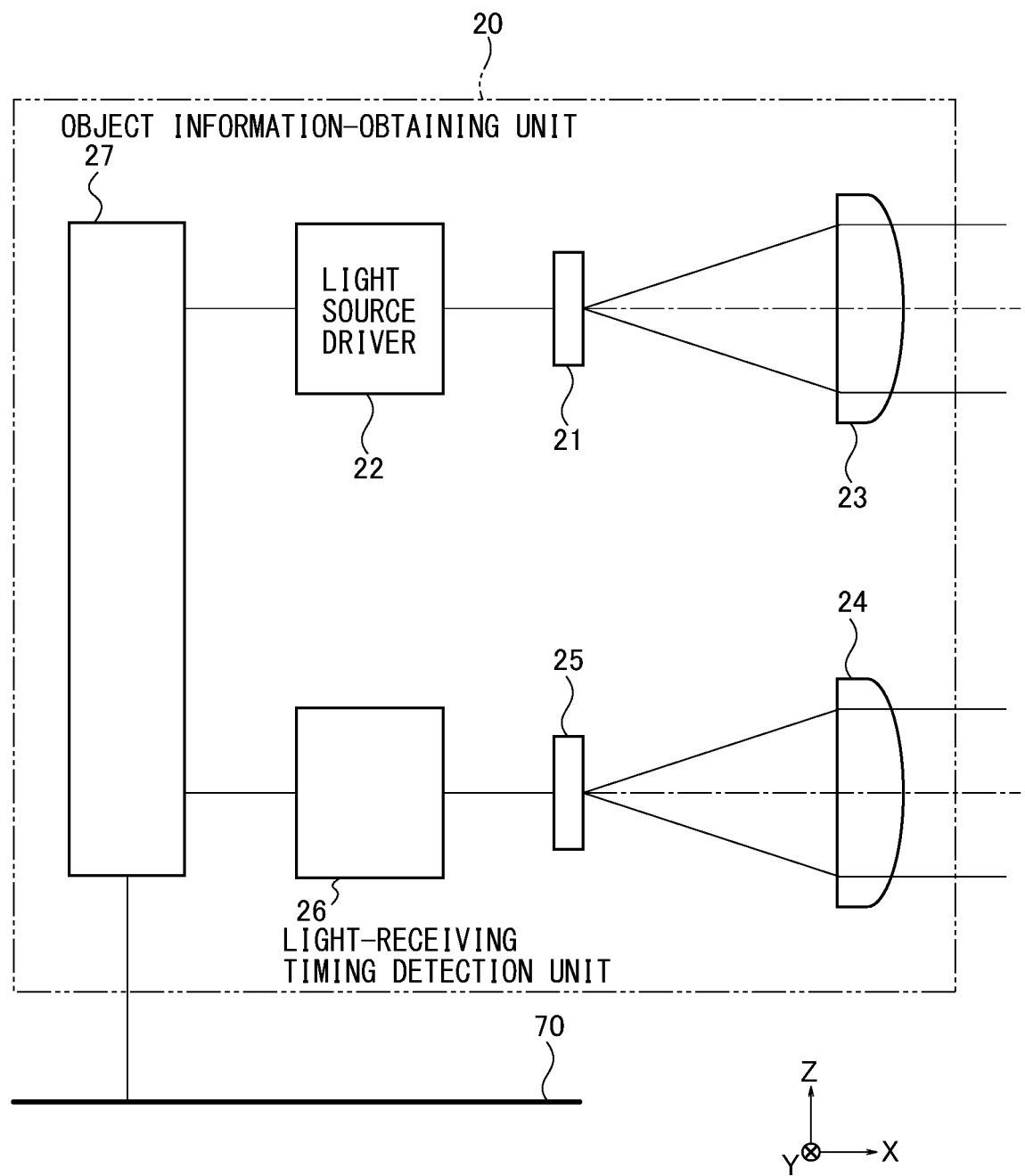

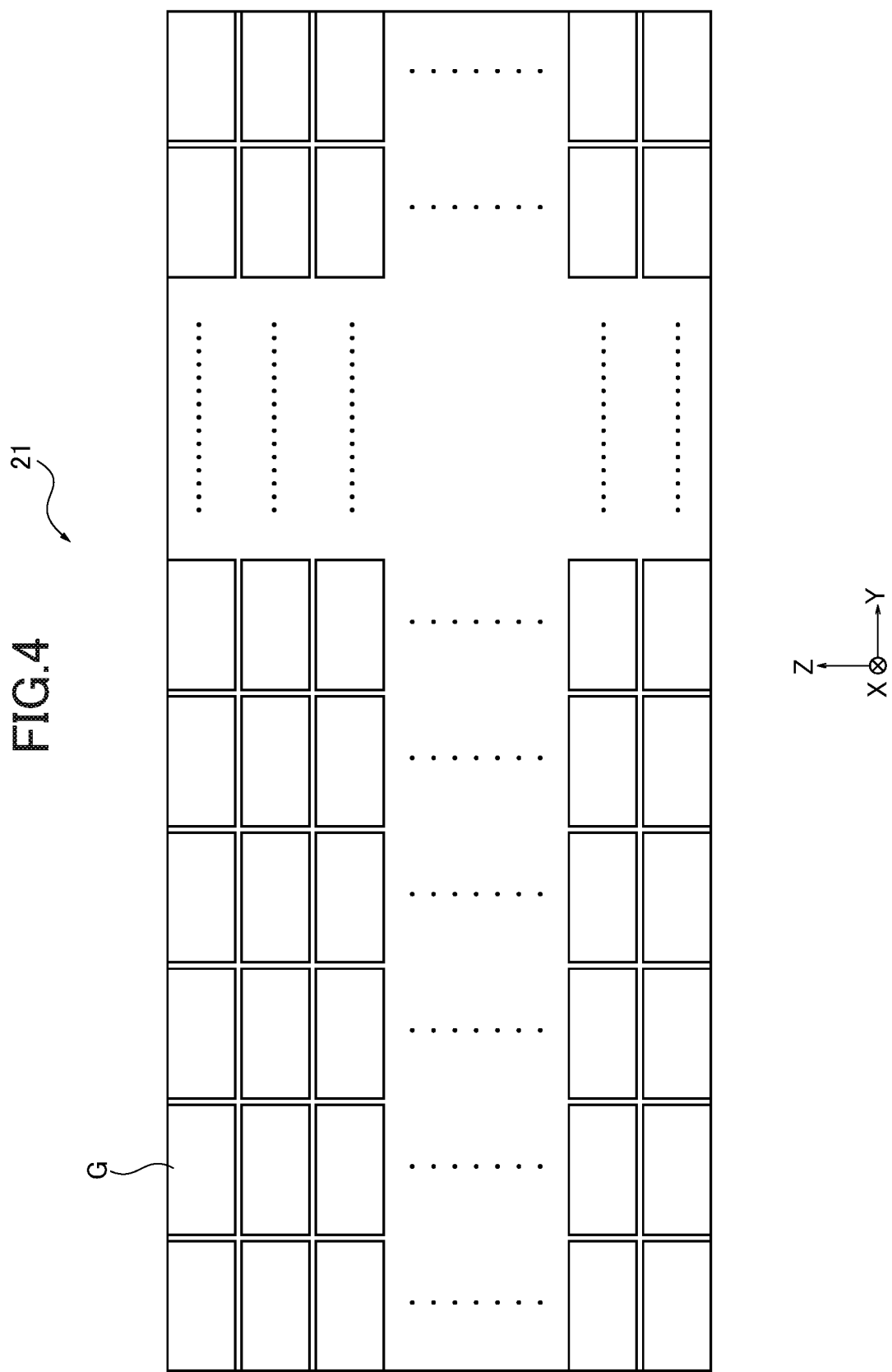

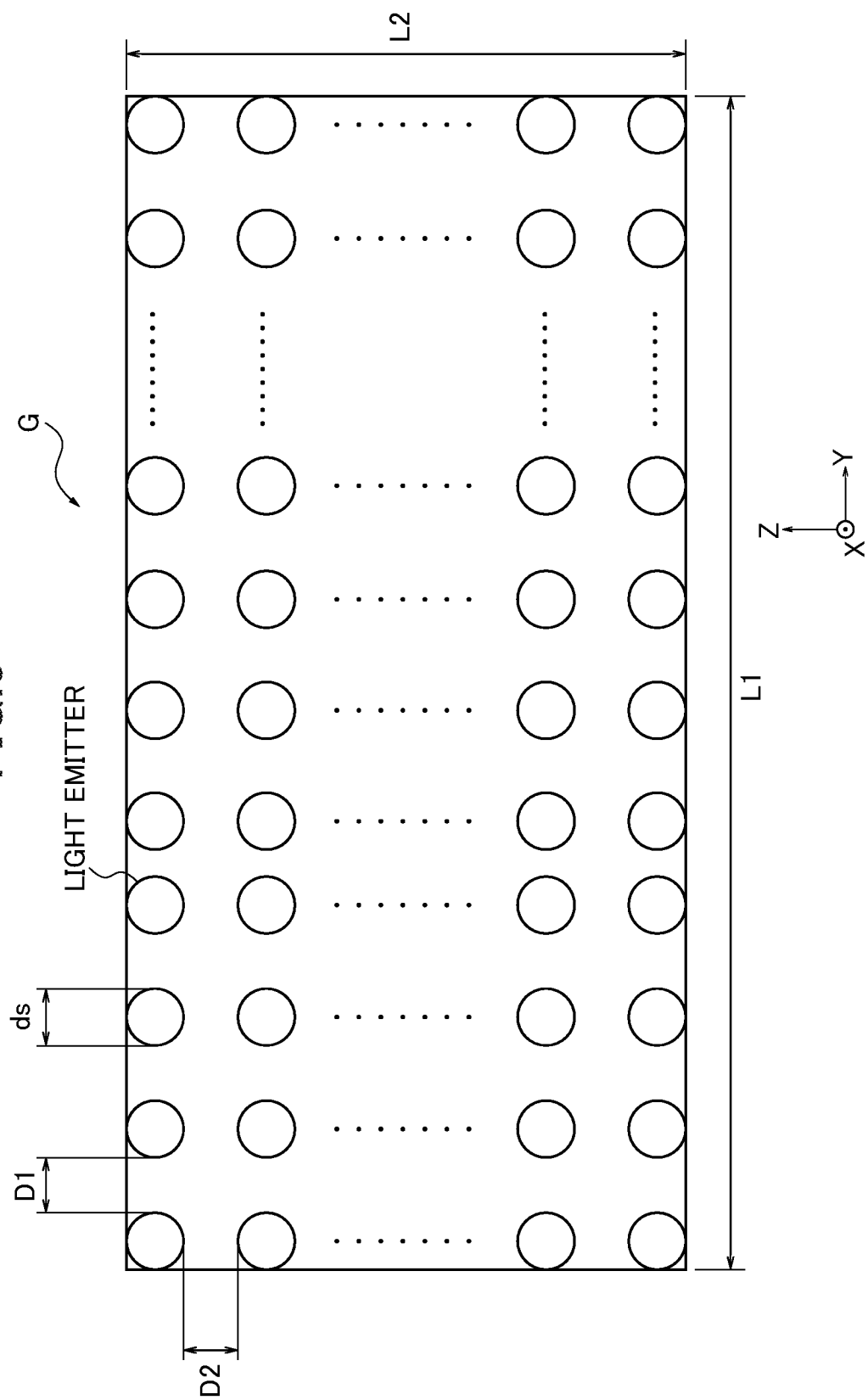

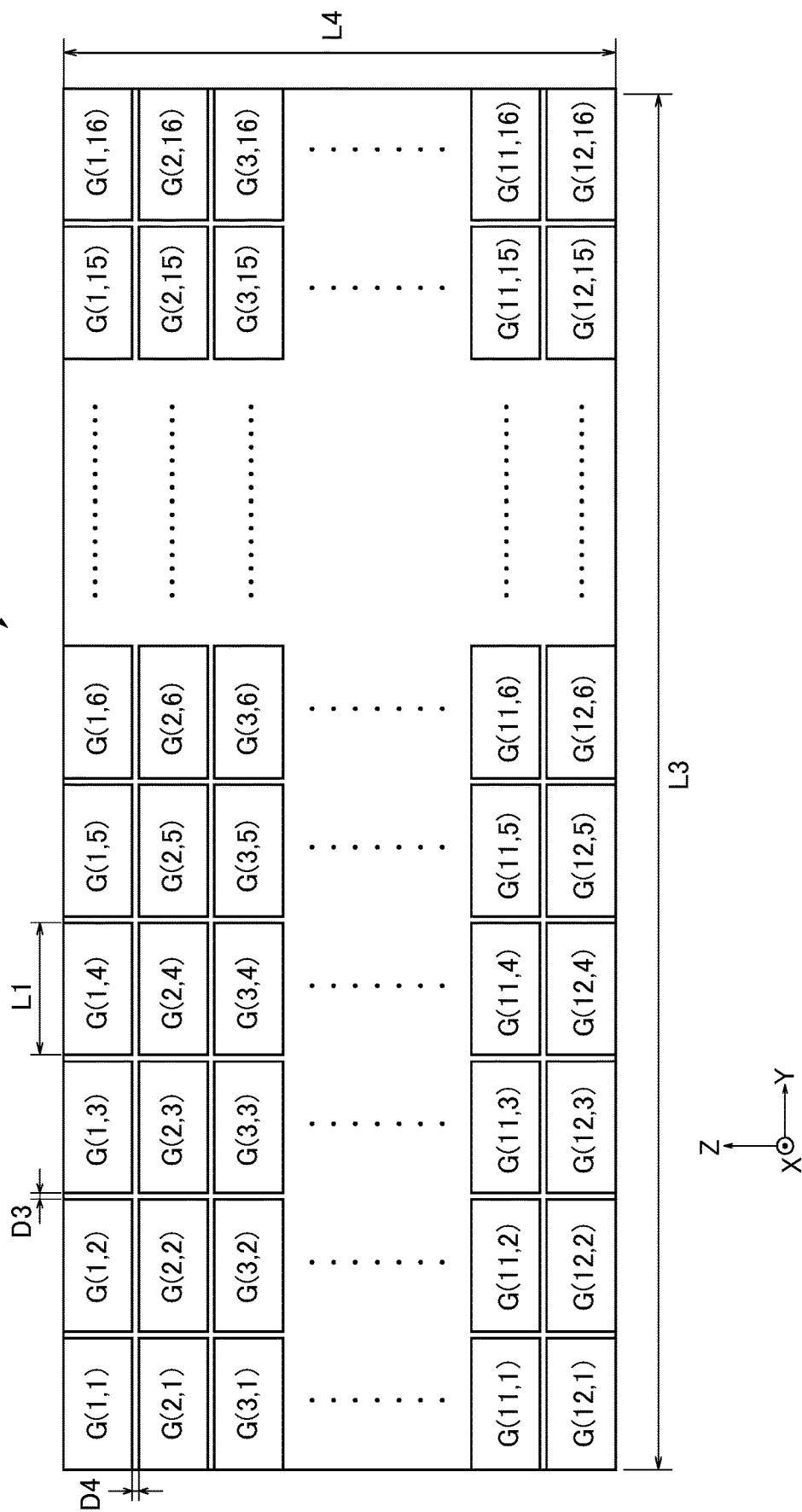

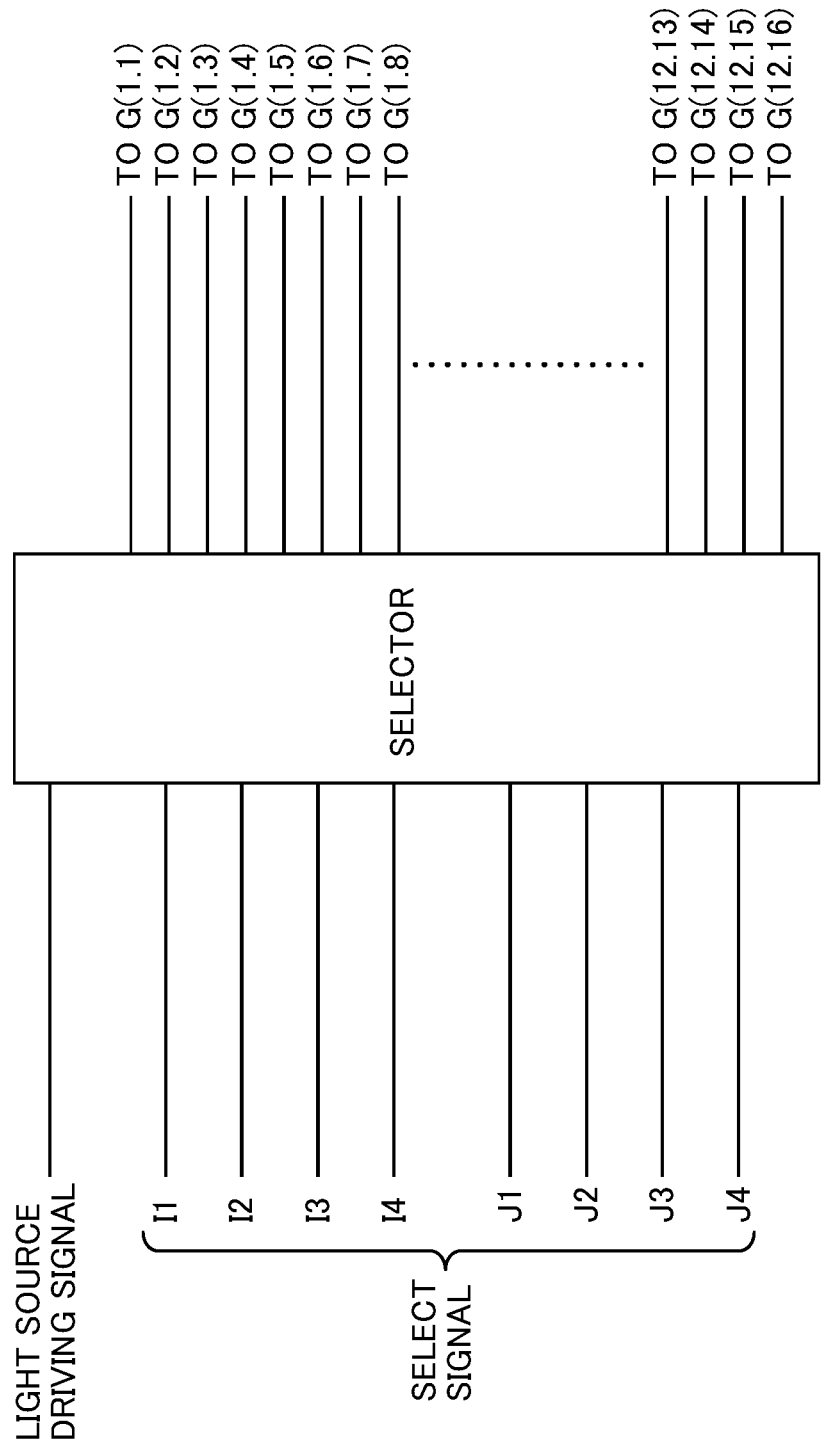

FIG.8

| I4 | I3 | I2 | I1 | J4 | J3 | J2 | J1 | SELECTED G (I, J) |
|---|---|---|---|---|---|---|---|---|
| L | L | L | L | L | L | L | L | G(1,1) |
| L | L | L | L | L | L | L | H | G(1,2) |
| L | L | L | L | L | L | H | L | G(1,3) |
| L | L | L | L | L | L | H | H | G(1,4) |
| L | L | L | L | L | H | L | L | G(1,5) |
| L | L | L | L | L | H | L | H | G(1,6) |
| L | L | L | L | L | H | H | L | G(1,7) |
| L | L | L | L | L | H | H | H | G(1,8) |
| L | L | L | L | H | L | L | L | G(1,9) |
| L | L | L | L | H | L | L | H | G(1,10) |
| L | L | L | L | H | L | H | L | G(1,11) |
| L | L | L | L | H | L | H | H | G(1,12) |
| L | L | L | L | H | H | L | L | G(1,13) |
| L | L | L | L | H | H | L | H | G(1,14) |
| L | L | L | L | H | H | H | L | G(1,15) |
| L | L | L | L | H | H | H | H | G(1,16) |
| L | L | L | H | L | L | L | L | G(2,1) |
| L | L | L | H | L | L | L | H | G(2,2) |
| L | L | L | H | L | L | H | L | G(2,3) |
| L | L | L | H | L | L | H | H | G(2,4) |
| L | L | L | H | L | H | L | L | G(2,5) |
| L | L | L | H | L | H | L | H | G(2,6) |
| L | L | L | H | L | H | H | L | G(2,7) |
| L | L | L | H | L | H | H | H | G(2,8) |
| L | L | L | H | H | L | L | L | G(2,9) |
| L | L | L | H | H | L | L | H | G(2,10) |
| L | L | L | H | H | L | H | L | G(2,11) |
| L | L | L | H | H | L | H | H | G(2,12) |
| L | L | L | H | H | H | L | L | G(2,13) |
| L | L | L | H | H | H | L | H | G(2,14) |
| L | L | L | H | H | H | H | L | G(2,15) |
| L | L | L | H | H | H | H | H | G(2,16) |
| ⋮ | ⋮ | ⋮ | ⋮ | ⋮ | ⋮ | ⋮ | ⋮ | ⋮ |
| H | L | H | H | L | L | H | H | G(12,4) |
| H | L | H | H | L | H | L | L | G(12,5) |
| H | L | H | H | L | H | L | H | G(12,6) |
| H | L | H | H | L | H | H | L | G(12,7) |
| H | L | H | H | L | H | H | H | G(12,8) |
| H | L | H | H | H | L | L | L | G(12,9) |
| H | L | H | H | H | L | L | H | G(12,10) |
| H | L | H | H | H | L | H | L | G(12,11) |
| H | L | H | H | H | L | H | H | G(12,12) |
| H | L | H | H | H | H | L | L | G(12,13) |
| H | L | H | H | H | H | L | H | G(12,14) |
| H | L | H | H | H | H | H | L | G(12,15) |
| H | L | H | H | H | H | H | H | G(12,16) |

FIG.14A
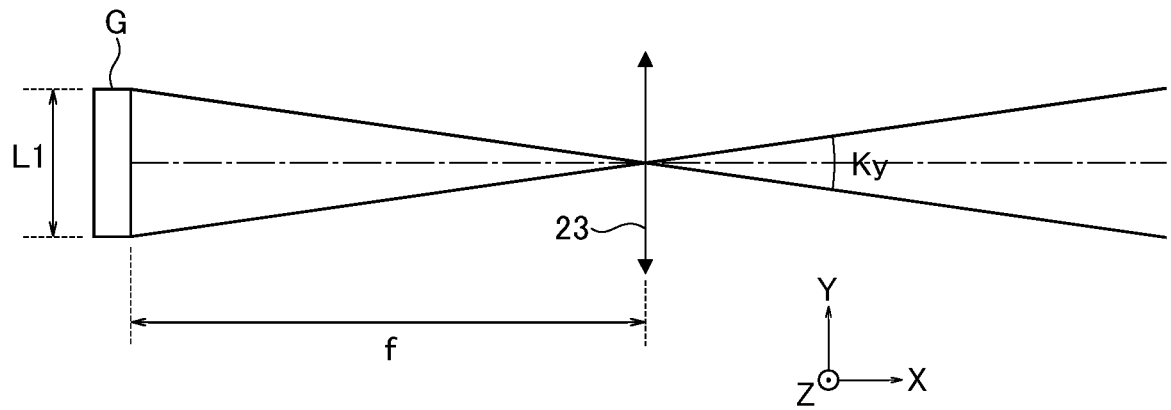
FIG.14B
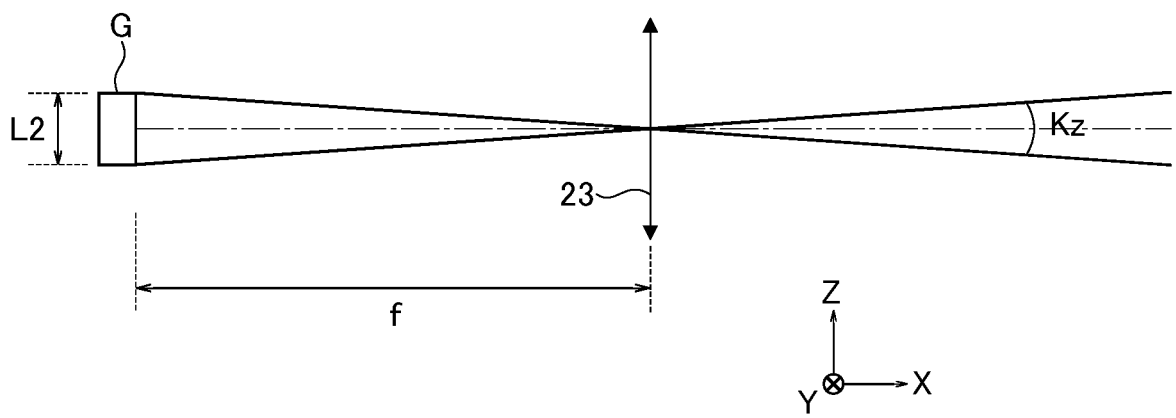
FIG.15
| f(mm) | 6 | 10 | 20 | 50 | 100 |
|---|---|---|---|---|---|
| Ky(DEGREE) | 2.99 | 1.79 | 0.9 | 0.36 | 0.18 |
| Kz(DEGREE) | 1.52 | 0.91 | 0.46 | 0.18 | 0.09 |
(L1=313 $\mu$m, L2=159 $\mu$m)

FIG.17A
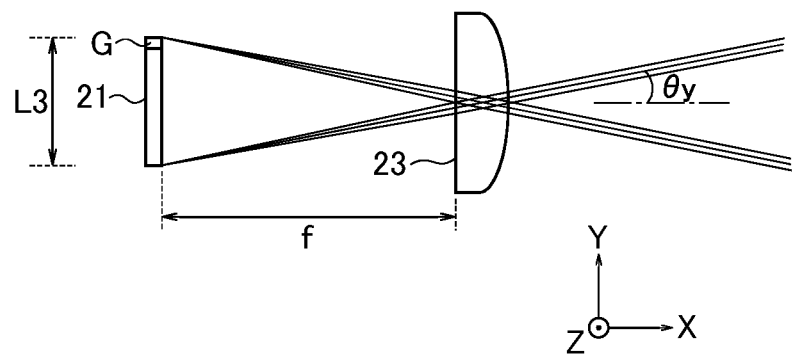
FIG.17B
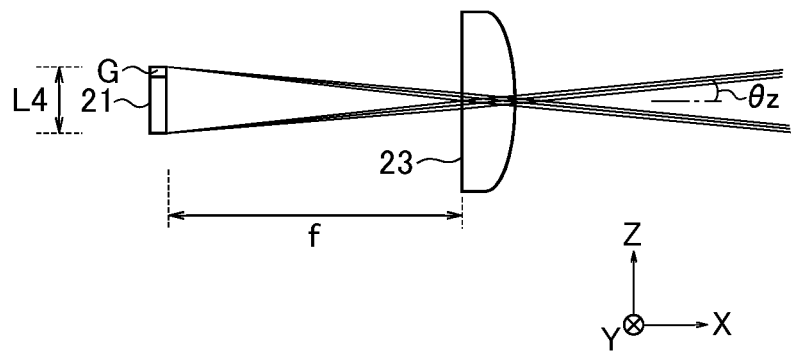
FIG.18
| f(mm) | 6 | 10 | 20 | 50 | 100 |
|---|---|---|---|---|---|
| Ky(DEGREE) | 2.99 | 1.79 | 0.9 | 0.36 | 0.18 |
| Kz(DEGREE) | 1.52 | 0.91 | 0.46 | 0.18 | 0.09 |
| $\theta$y(DEGREE) | 22.65 | 14.06 | 7.14 | 2.87 | 1.43 |
| $\theta$z(DEGREE) | 9.03 | 5.45 | 2.73 | 1.09 | 0.55 |
(L1=313μm, L2=159μm)
(L3=5.008mm, L4=1.908mm)

PERIPHERAL PART OF DETECTION REGION

CENTRAL PART OF DETECTION REGION

FIG.29

OBJECT DETECTOR AND SENSOR

CROSS REFERENCE TO RELATED APPLICATIONS

The present application is a continuation of U.S. application Ser. No. 15/729,324 filed Oct. 10, 2017, which is a continuation of U.S. application Ser. No. 15/371,650 filed Dec. 7, 2016 (now U.S. Pat. No. 9,817,123), which is a continuation of U.S. application Ser. No. 14/554,498 filed Nov. 26, 2014 (now U.S. Pat. No. 9,568,605), which is based on and claims priority from Japanese Patent Application No. 2013-252683 filed Dec. 6, 2013, and Japanese Patent Application No. 2014-002813 filed Jan. 10, 2014, the disclosures of each of which are hereby incorporated by reference in their entirety.

BACKGROUND

Field of the Invention

The present invention relates to an object detector and a sensor, in particular, to an object detector using an object as a detection target and a sensor including the object detector.

Description of the Related Art

The development of a sensor using laser light has increased considerably in recent years.

For example, JP 3446466B discloses a reflection sensor including a rotating polygon mirror, a pulse light incident unit which emits pulse light to enter into the rotating polygon mirror from a predetermined direction, and a light receiver which receives the pulse light emitted from a reflection surface of the rotating polygon mirror to a forward measurement area, and reflected by an object in the measurement area.

As another example, JP 2894055B discloses a laser radar which is installed in a vehicle, and determines the existence or non-existence of an obstacle from object-reflected light of laser light emitted in a forward space in a traveling direction.

However, in the devices disclosed in JP 3446466B and JP 2894055B, it is difficult to satisfy an increase in distance to a detectable object, expansion of a detection region in an up and down direction, and improvement in detection resolution performance in an up and down direction.

SUMMARY

One embodiment of the present invention provides an object detector, including: a projector including a light source having a two-dimensionally arranged plurality of light emitter groups, each of the light emitter group having a plurality of light emitters; a light receiver which receives light emitted from the projector, and reflected by an object; and a light source driver which lights on and lights off each of the light emitter groups of the light source.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

FIG. 3 is a view illustrating the configuration of the laser radar 20.

FIG. 4 is a view illustrating a plurality of light emitter groups in a light source 21.

FIG. 5 is a view illustrating one light emitter group.

FIG. 6 is a view illustrating light emitter groups G (i, j).

FIG. 7 is a view illustrating a light source driver.

FIG. 8 is a view illustrating a relationship between a select signal and a light emitter group selected by a selector.

FIGS. 14A, 14B are views each illustrating a divergence angle.

FIG. 15 is a view illustrating a relationship between a divergent angle and a focal length f of a coupling lens 23.

FIGS. 17A, 17B are views each illustrating a detection angle.

FIG. 18 is a view illustrating a relationship between a detection angle and a focal length f of the coupling lens 23.

FIG. 29 is a view illustrating assembly light emitter groups.

DESCRIPTION OF THE PREFERRED EMBODIMENT

Figure 1:
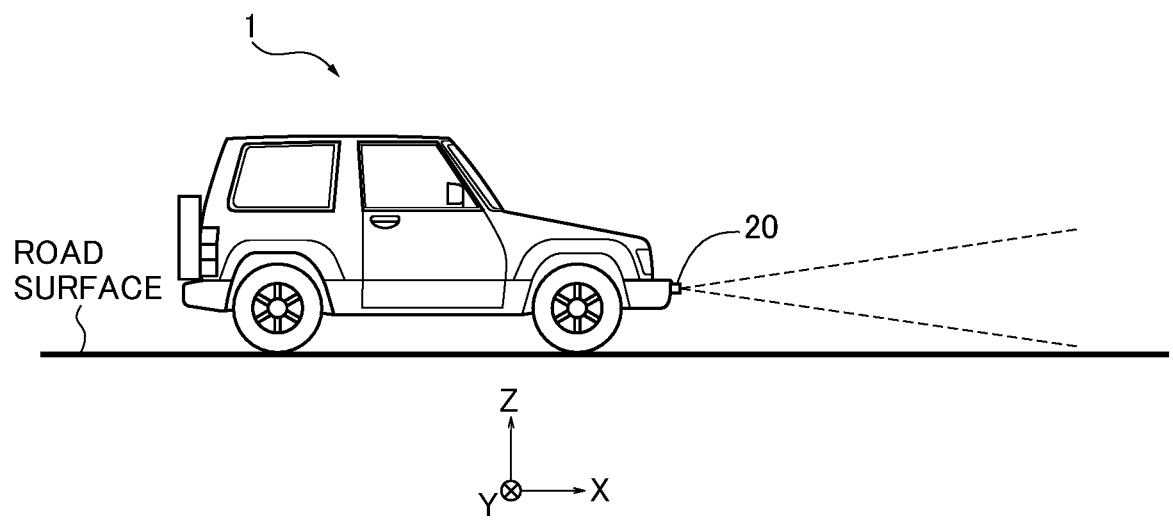
FIG. 1 is an external view illustrating a vehicle in which a laser radar 20 according to one embodiment of the present invention is installed.

Hereinafter, one embodiment of the present invention will be described with reference to FIGS. 1 to 21. FIG. 1 illustrates the external appearance of a vehicle 1 in which a laser radar 20 as an object detector according to one embodiment of the present invention is installed.

The laser radar 20 is attached near the front number plate of the vehicle 1 as one example. In addition, in this embodiment, a direction orthogonal to a road surface is the Z-axis direction, and a forward movement direction of the vehicle 1 is the +X direction in XYZ three-dimensional orthogonal coordinates.

Figure 2:
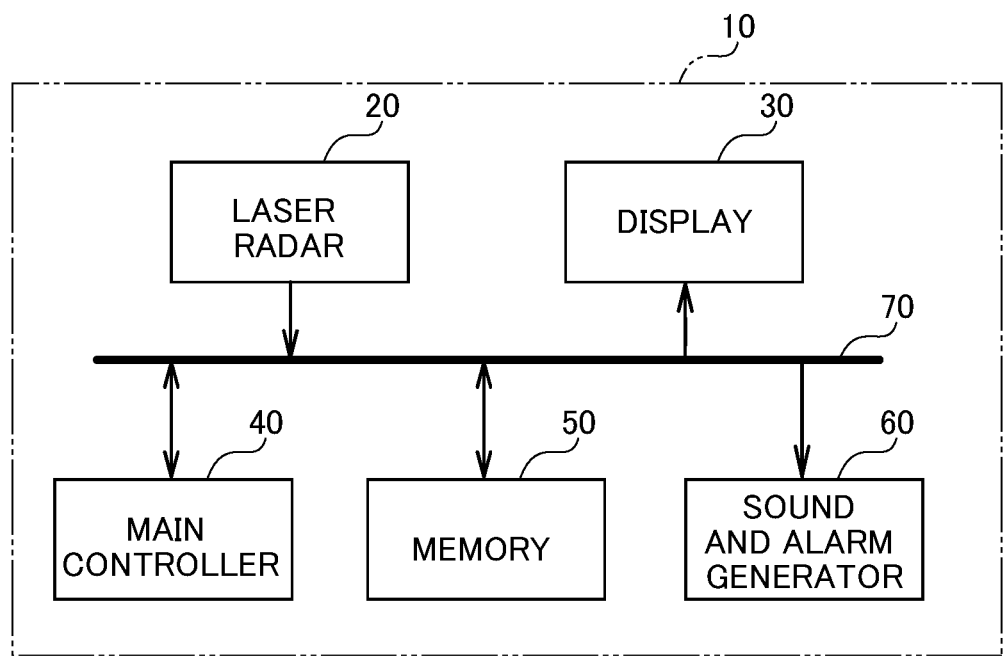
FIG. 2 is a block diagram illustrating a configuration of a monitor 10 according to one embodiment of the present invention.

As illustrated in FIG. 2 as one example, the vehicle 1 includes inside thereof a display 30, main controller 40, memory 50, and sound and alarm generator 60. These are electrically connected through a data transmittable bus 70.

A monitor 10 as a sensor includes the laser radar 20, display 30, main controller 40, memory 50, and sound and alarm generator 60.

The laser radar 20 includes, as illustrated in FIG. 3 as one example, a light source 21, light source driver 22, coupling lens 23, light-receiving lens 24, light receiver 25, light-receiving timing detection unit 26, and object information-obtaining unit 27.

The light source 21 includes a plurality of light emitters. Each light emitter is Vertical-Cavity Surface-Emitting Laser (VCSEL). Namely, the light source 21 includes a VCSEL array.

As illustrated in FIG. 4 as one example, a plurality of light emitters of the light source 21 is divided into a plurality of light emitter groups G arranged in a matrix. In each light emitter group G, as illustrated in FIG. 5 as one example, a plurality of light emitters is two-dimensionally arranged.

In this case, as one example, each light emitter group G includes 12560 (=157×80) light emitters two-dimensionally arranged at equal intervals such that 157 light emitters are arranged in the Y-axis direction and 80 light emitters are arranged in the X-axis direction. When the light output of one light emitter is 2 mW, and 12560 light emitters are simultaneously lighted on, the light output of one light emitter group G is about 25 W.

When a diameter ds of one light emitter is 1 μm, a distance D1 between two light emitters adjacent to each other in the Y-axis direction is 1 μm and a distance D2 between two light emitters adjacent to each other in the Z-axis direction is 1 μm, and a length L1 of one light emitter group G in the Y-axis direction is 313 μm and a length L2 of one light emitter group G in the Z-axis direction is 159 μm.

As one example, the light source 21 includes 192 (=16× 12) light emitter groups G arranged in matrix at equal intervals such that 16 light emitter groups G are arranged in the Y-axis direction and 12 light emitter groups G are arranged in the Z-axis direction. In addition, when it is necessary to distinguish 192 light emitter groups G, as illustrated in FIG. 6, the light emitter groups are represented as G (i, j) with the arrangement sequence in the −Z-axis direction as i (1≤i≤12) and the arrangement sequence in the +Y-axis direction as j (1≤j≤16).

A length L3 of the light source 21 in the Y-axis direction is 5.008 mm (=313 μm×16), and a length L4 of the light source 21 in the X-axis direction is 1.908 mm (=159 μm×12).

A distance D3 between the two light emitter groups adjacent to each other in the Y-axis direction is set such that a space between the light emitter located on the most +Y side in the light emitter group on the −Y side and the light emitter located on the most −Y side in the light emitter group on the +Y side is equal to D1.

A distance D4 between the two light emitter groups adjacent to each other in the Z-axis direction is also set such that a space between the light emitter located on the most +Z side in the light emitter group on the −Z side and the light emitter located on the most −Z side in the light emitter group on the +Z side is equal to D2.

Namely, a plurality of light emitters in the light source 21 is arranged at equal intervals in the Y-axis direction and the Z-axis direction. With this arrangement, an even resolution performance can be achieved, and the processes in the object information-obtaining unit 27 can be simplified.

In this case, the light emitter groups having i=1 to 8 are for a front surface, and the light emitter groups having i=9 to 12 are for a road surface.

Referring to FIG. 3, the light source driver 22 controls the driving of the light source 21 based on the instruction of the object information-obtaining unit 27.

In this case, the light source driver 22 includes a selector which inputs a light source driving signal and selects signals made of 8 signals (I1 to I4, J1 to J4), as illustrated in FIG. 7 as one example. In this selector, as illustrated in FIG. 8, when I1=L (low level), I2=L, I3=L, I4=L, J1=L, J2=L, J3=L, and J4=L, for example, G (1, 1) is selected, and the light source driving signal is output to G (1, 1). Moreover, when I1=H (high level), I2=H, I3=L, I4=H, J1=H, J2=H, J3=H, and J4=H, for example, G (12, 16) is selected, and the light source driving signal is output to G (12, 16).

The coupling lens 23 changes the light emitted from the light source 21 into substantially parallel light. The light through the coupling lens 23 is light to be emitted from the laser radar 20.

The light-receiving lens 24 is disposed on the optical axis of the light emitted from the laser radar 20, and reflected by the object, so as to collect the light.

The light receiver 25 receives the light collected by the light-receiving lens 24, and outputs electric signals corresponding to the received light volume.

The light-receiving timing detection unit 26 monitors an output signal of the light receiver 25, and detects the light-receiving timing of the light reflected by the object.

Figure 9:
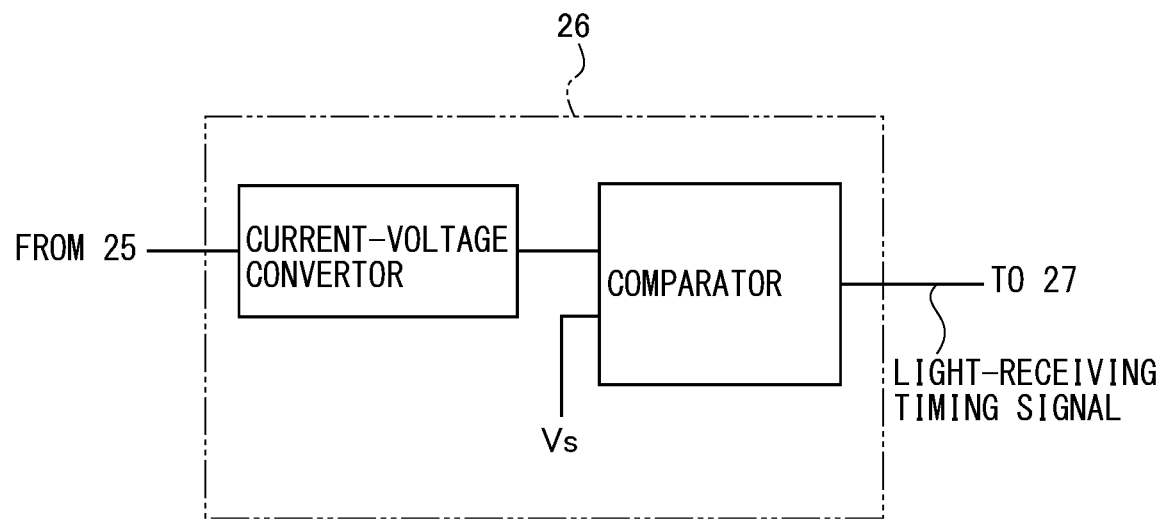
FIG. 9 is a view illustrating a light-receiving timing detection unit.
Figure 10:
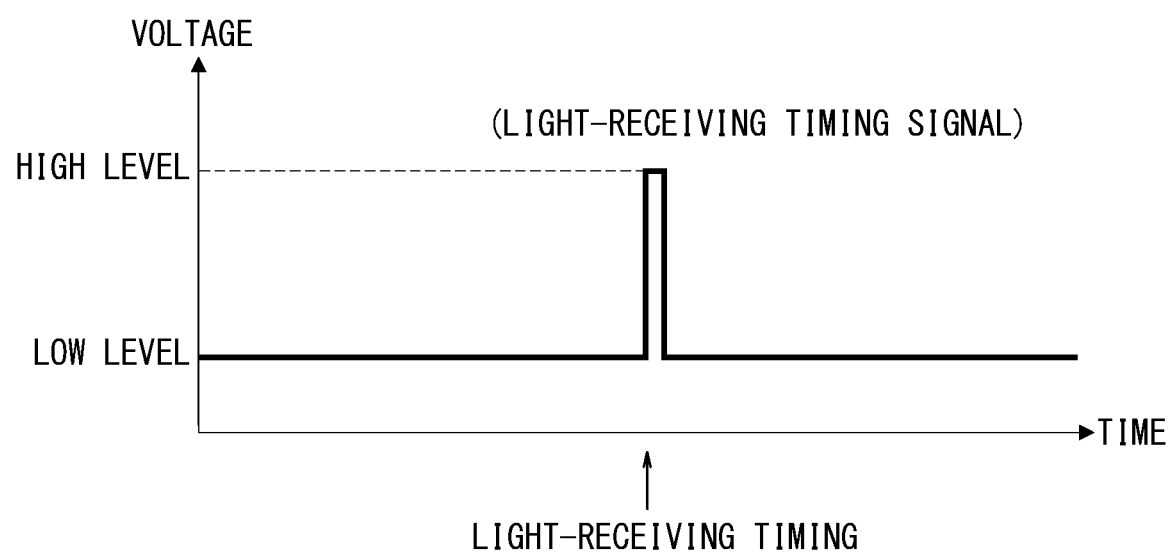
FIG. 10 is a view illustrating a light-receiving timing signal.

In this case, as illustrated in FIG. 9 as one example, the light-receiving timing detection unit 26 includes a current-voltage convertor and a comparator. The current-voltage convertor converts the current signal output from the light receiver 25 into the voltage signal. The comparator outputs a light-receiving timing signal which reaches a low level when the voltage of the voltage signal output from the current-voltage convertor is equal to the previously set voltage Vs or below, and reaches a high level when the voltage is larger than the voltage Vs. As illustrated in FIG. 10 as one example, in the light-receiving timing, the light-receiving timing signal is changed from the low level to the high level. The light-receiving timing signal is output to the object information-obtaining unit 27.

The object information-obtaining unit 27 instructs the light emitter group to be lighted on and the lighting-on/lighting-off timing of the light emitter group to the light source driver 22. The object information-obtaining unit 27 obtains object information such as the existence or non-existence of an object, distance to an object, size, shape, and position of an object based on the lighting-on timing and the light-receiving timing signal from the light-receiving timing detection unit 26.

Figure 11:
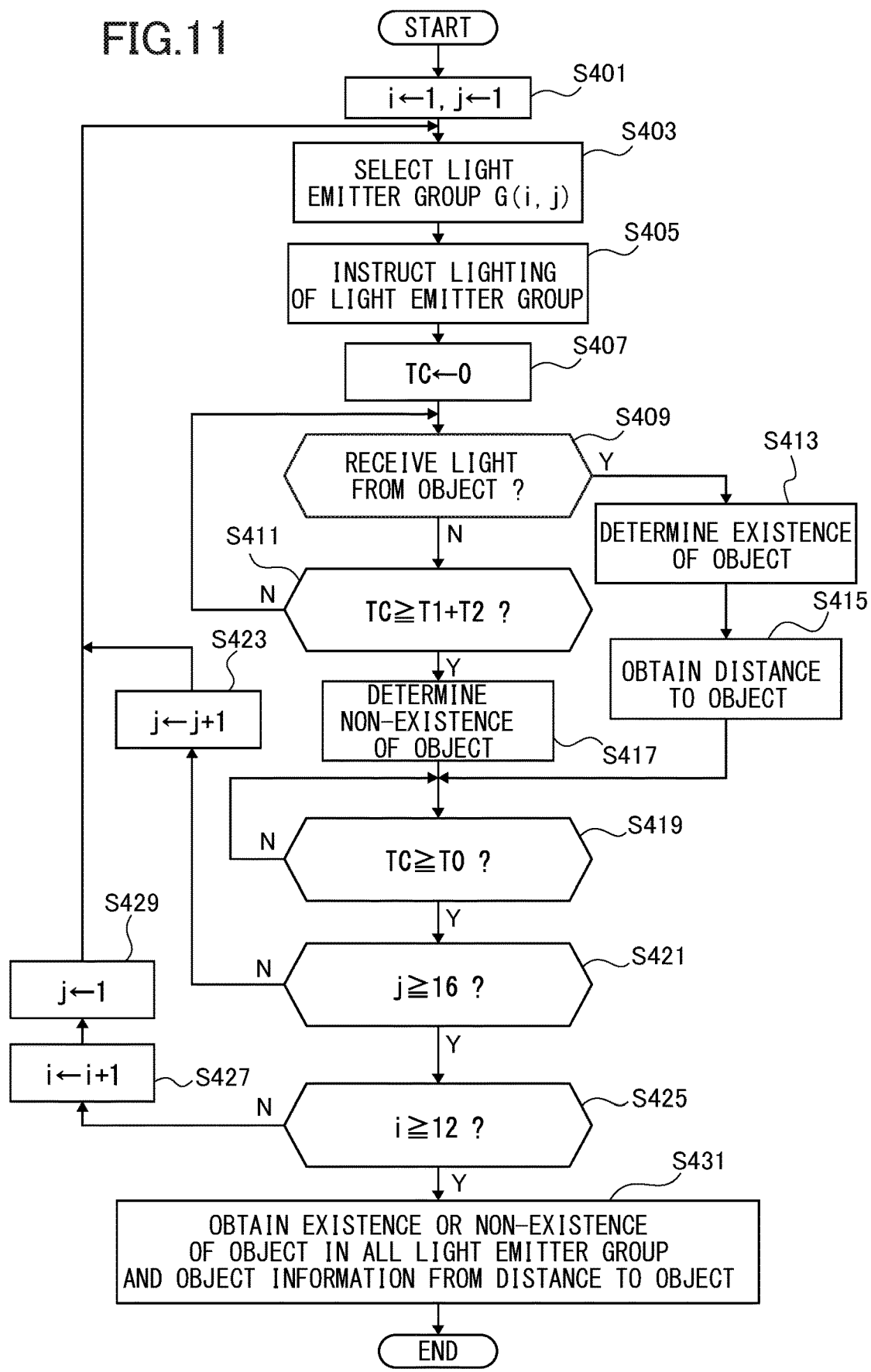
FIG. 11 is a flowchart illustrating a performance of an object information-obtaining unit.

FIG. 11 illustrates a flowchart of an object information-obtaining process which is executed by the object information-obtaining unit 27. In addition, the object information-obtaining unit 27 repeatedly executes the object information-obtaining process at a predetermined timing (in this case, once in 20 seconds) until the power source is switched off. The object information-obtaining unit 27 includes an interruption controller having a timer function, and is informed by interruption upon the elapse of a predetermined time (in this case, T1+T2, T0 (refer to FIG. 12)).

In the first Step S401, the variable numbers i, j which specify the light emitter group are set to the initial value 1.

In the next Step S403, the select signal for selecting the light emitter group G (i, j) is output to the light source driver 22.

In the next Step S405, the lighting-on of the selected light emitter group G (i, j) is instructed to the light source driver 22. The light source driver 22 thereby simultaneously lights on all of the light emitters in the light emitter group G (i, j) only for a predetermined time T1 (refer to FIG. 12). In this case, T1=0.02 μsec, as one example.

In the next Step S407, the timer counter TC in the interruption controller is reset to 0. In addition, the value of the timer counter TC is counted up by the interruption controller.

In the next Step S409, it is determined whether or not the light reflected by the object is received by the light receiver 25 based on the light-receiving timing signal from the light-receiving timing detection unit 26. When the light receiver 25 does not receive the light (NO in S409), the process moves to Step S411.

In Step S411, it is determined whether or not the value of the timer counter TC is equal to a value corresponding to T1+T2 (refer to FIG. 12) or more. In this case, as one example, T2 is 1.3 μsec which is a time required for returning the light reflected and scattered by the object 200 m away. When there is no interruption at the time that the value of the timer counter TC reaches a value corresponding to T1+T2 from the interruption controller (NO in S411), the process goes back to Step S409.

In addition, in Step S409, when the light receiver 25 receives light (YES in S409), the process moves to Step S413.

In Step S413, the existence of the object is determined.

In the next Step S415, the distance to the object is obtained based on the value of the timer counter TC and the light-receiving timing of the light receiver 25. Then, the obtained distance to the object is stored in a not-shown memory of the object information-obtaining unit 27 together with the object existence information, the detection time, and the values of valuable numbers i, j. Then, the process moves to Step S419.

In Step S411, when there is the interruption at the time that the value of the timer counter TC reaches the value corresponding to T1+T2 from the interruption controller (YES in S411), the process moves to Step S417.

In Step S417, the non-existence of the object is determined. The non-existence object information is stored in a not-shown memory of the object information-obtaining unit 27 together with the detection time and the values of the valuable numbers i, j.

In the next Step S419, it is determined whether or not the value of the timer counter TC is equal to a value corresponding to the time T0 (refer to FIG. 12) or more. In this case, T0 is 104 μsec since the object information-obtaining process is repeatedly executed once in 20 msec. In this case, the light source 21 is lighted on only for 0.02 μsec once in 104 μsec. Thus, eyes can be protected. When there is no interruption at the time that the value of the timer counter TC reaches the value corresponding to T0 from the interruption controller (NO in S419), the process waits for the interruption. When there is the interruption (YES in S419), the process moves to Step S421.

In Step S421, it is determined whether or not the value of the valuable number j is equal to 16 or more. When the value of the valuable number j is less than 16 (NO in S421), the process moves to Step S423.

In Step S423, 1 is added to the value number j, and the process returns to Step S403.

The processes in Steps S403 to S423 are repeated until the value of the valuable number j reaches equal to 16 or more (YES in S421).

When the value of the valuable number j reaches equal to 16 or more (YES in S421), the process moves to step S425.

In step S425, it is determined whether or not the value of the valuable number i is equal to 12 or more. When the value of the valuable number i is less than 12 (NO in S425), the process moves to Step S427.

In Step S427, 1 is added to the value of the valuable number i.

In the next Step S429, the value of the valuable number j is returned to the initial value 1, and the process returns to Step S403.

The processes of Steps S403 to S429 are repeated (refer to FIG. 13) until the value of the valuable number i reaches equal to 12 or more (YES in S425).

When the value of the valuable number i reaches equal to 12 or more (YES in S425), the process moves to Step S431.

In step S431, the information regarding the existence or the non-existence of the object and the distance to the object are read from a not-shown memory of the object information-obtaining unit 27 for all light emitter groups. Then, the three-dimensional position and the size of the object are obtained. The obtained object information is stored in the memory 50 together with the detection time. Then, the object information-obtaining process is completed.

Figure 12:
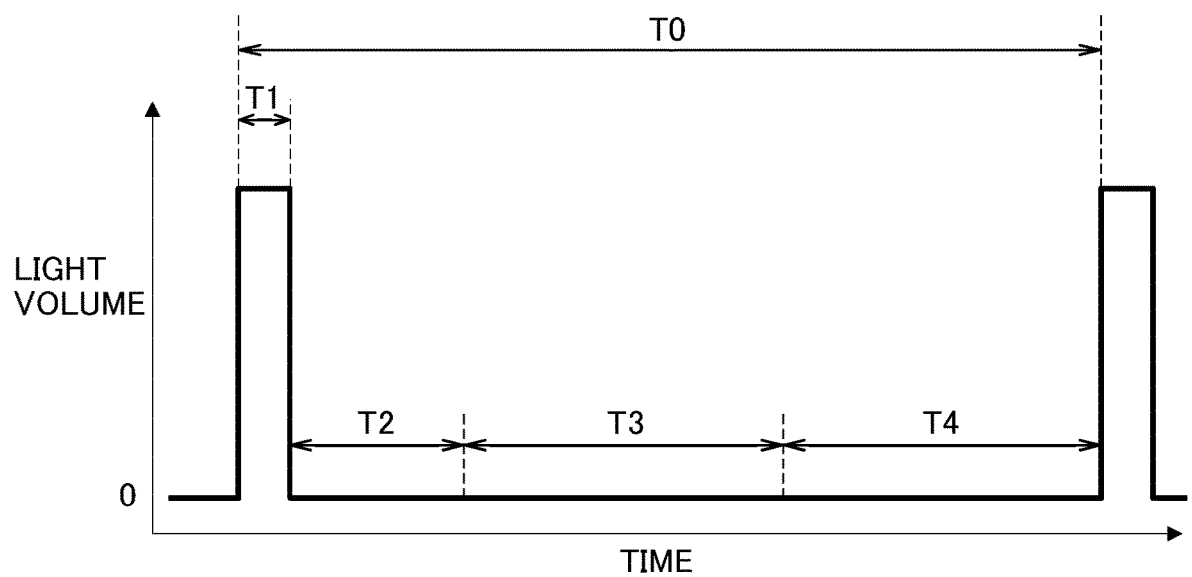
FIG. 12 is a timing chart illustrating a lighting-on time of one light emitter group.
Figure 13:
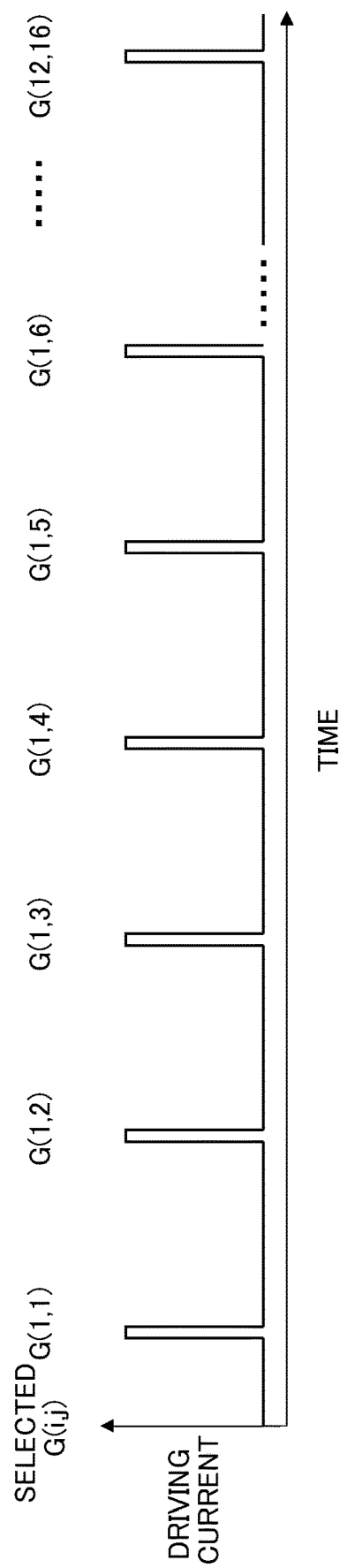
FIG. 13 is a timing chart illustrating a relationship between driving current and a selected light emitter group.
Figure 16A:
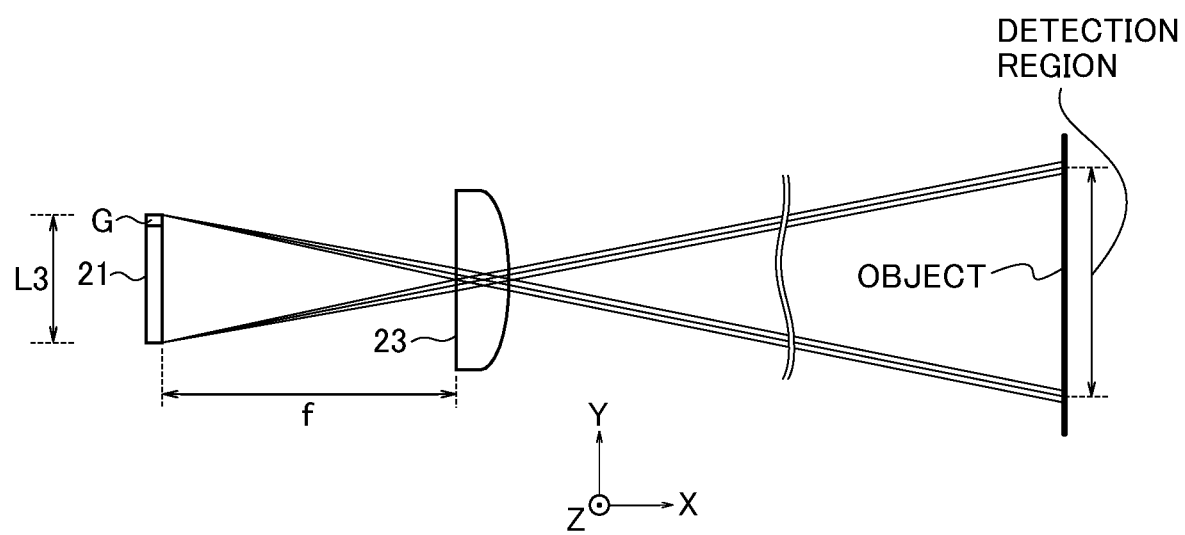
FIGS. 16A, 16B are views each illustrating a detection region.
Figure 16B:
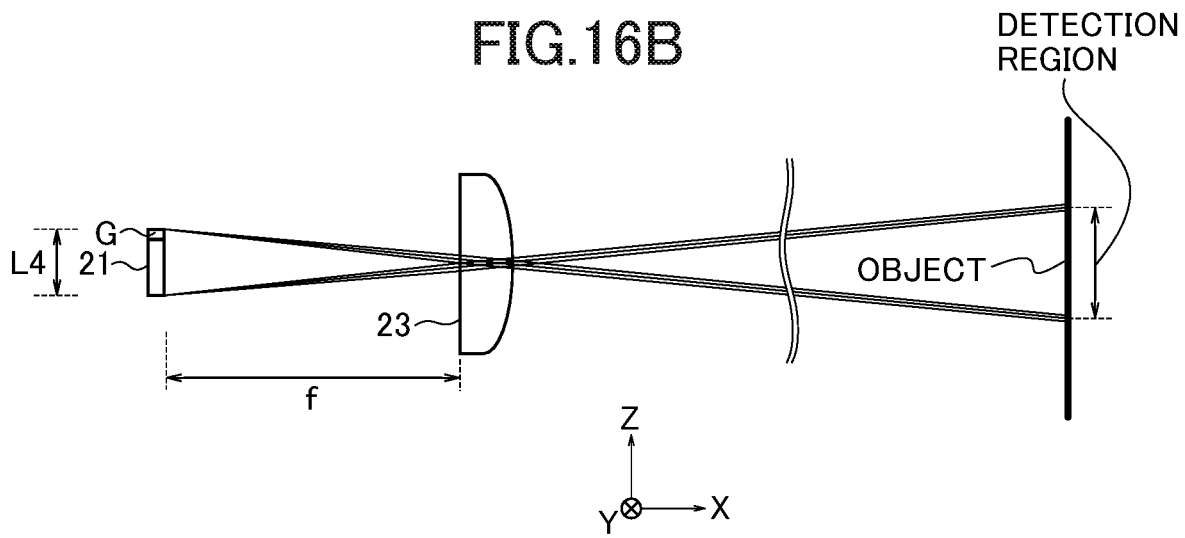
Figure 19A:
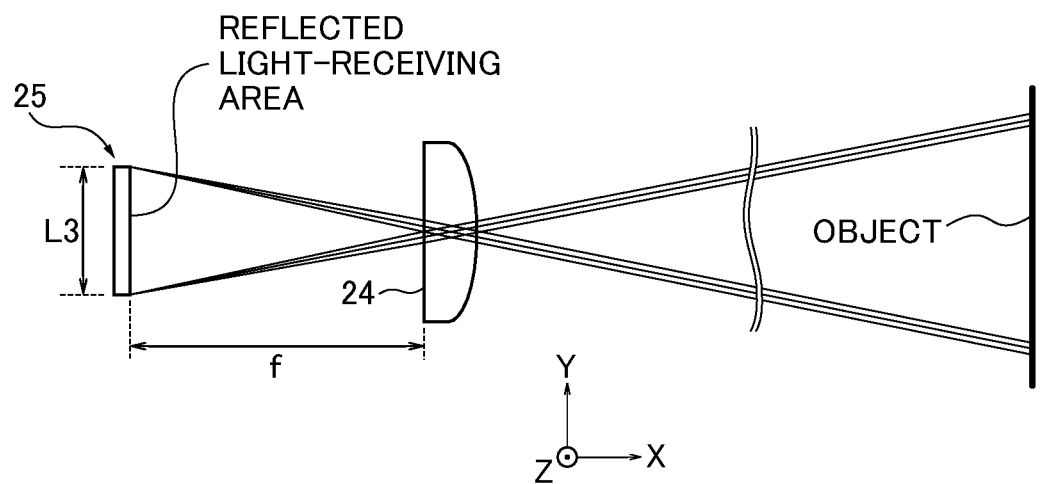
FIGS. 19A, 19B are views each illustrating a reflected light-receiving area of a light receiver 25.
Figure 19B:
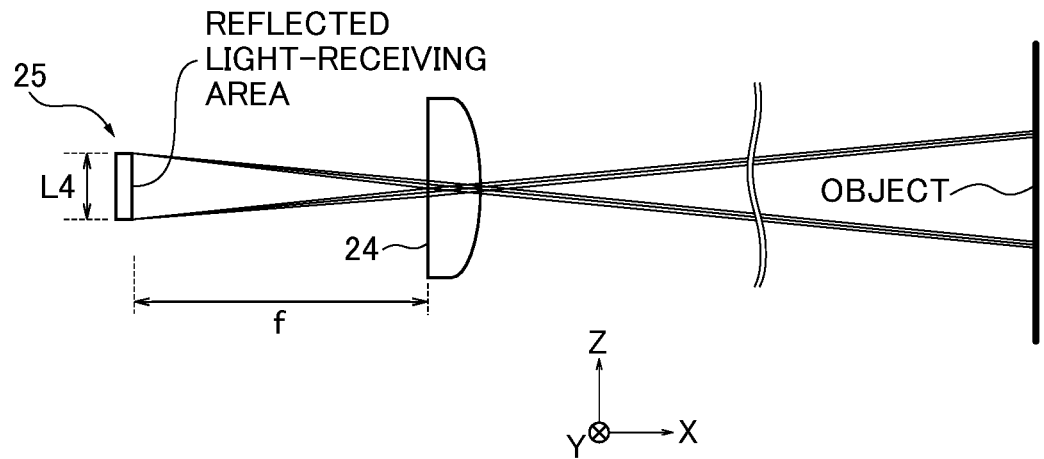

Time T3 in FIG. 12 is a calculation time required for obtaining the distance to the object. In this case, T3 is about 10 μsec. Time T4 in FIG. 12 is a margin time, and it is about 93 μsec. As described above, since the margin time is provided, Time T2 can be freely set depending on the intended use.

Next, the detection resolution performance of the laser radar 20 will be described. In this case, the size of the area in the object to which the light is irradiated when the light is irradiated from one light emitter group to the object is the detection resolution performance. The smaller the area is, the higher the detection resolution performance is. The detection resolution performance relates to a divergence angle of light emitted from the coupling lens 23 when one light emitter group is lighted on. The smaller the divergence angle is, the higher the detection resolution performance is.

In this case, as illustrated in FIGS. 14A, 14B as one example, the divergence angle in the Y-axis direction is Ky, and the divergence angle in the Z-axis direction is Kz. In this case, the divergence angle Ky can be obtained by the following formula (1), and the divergence angle Kz can be obtained by the following formula (2). In this case, L1 denotes a length of the light emitter group in the Y-axis direction, L2 denotes a length of the light emitter group in the Z-axis direction, and f denotes a focal length of the coupling lens 23.

$$Ky = 2 \times \tan^{-1}(L1/2f) \quad (1)$$

$$Kz = 2 \times \tan^{-1}(L2/2f) \quad (2)$$

The relationship between the focal length f of the coupling lens 23 and the divergence angle Ky where L1=313 μm, and the relationship between the focal length f of the coupling lens 23 and the divergence angle Kz where L2=159 μm are illustrated in FIG. 15. As illustrated in FIG. 15, the longer the focal length f of the coupling lens is, the smaller the divergence angle is. Namely, the longer the focal length f of the coupling lens is, the higher the detection resolution performance is.

Next, the detection region of the laser radar 20 will be described. In this case, the detection region is the size of the area in the object position to which the light is irradiated when all of the light emitter groups are lighted on (refer to FIGS. 16A, 16B). In addition, since the detection region differs in accordance with an object position, the detection region corresponds to the detection angle which is a divergence angle of the light emitted from the coupling lens 23 when all of the light emitter groups are lighted on.

Then, as illustrated in FIGS. 17A, 17B as one example, the detection angle in the Y-axis direction is θy and the detection angle in the Z-axis direction is θz. In this case, the detection angle θy can be obtained by the following formula (3), and the detection angle θz can be obtained by the following formula (4). In this case, L3 denotes a length of the light source 21 in the Y-axis direction, L4 denotes a length of the light source 21 in the Z-axis direction, and f denotes a focal length of the coupling lens 23.

$$\theta y = \tan^{-1}(L3/2f) \quad (3)$$

$$\theta z = \tan^{-1}(L4/2f) \quad (4)$$

The relationship between the focal length f of the coupling lens 23 and the detection angle θy where L3=5.008 mm, and the relationship between the focal length f of the coupling lenxs 23 and the detection angle θz where L4=1.908 mm are illustrated in FIG. 18. As illustrated in FIG. 18, the shorter the focal length f of the coupling lens is, the larger the detection angle is. Namely, the shorter the focal length f of the coupling lens is, the wider the detection region is.

An appropriate detection region and detection resolution performance can be set according to the intended use of the laser radar 20.

The focal length of the light-receiving lens 24 is the same as the focal length f of the coupling lens 23. The light receiver 25 includes a single light-receiving element, and an area (hereinafter referred to as reflected light-receiving area) which receives the light reflected by the object has the same size as the emission light area of the light source 21. Namely, the area has a rectangular shape having 5.008 mm in length L3 in the Y-axis direction and 1.908 mm in length L4 in the Z-axis direction (refer to FIGS. 19A, 19B).

Figure 20A:
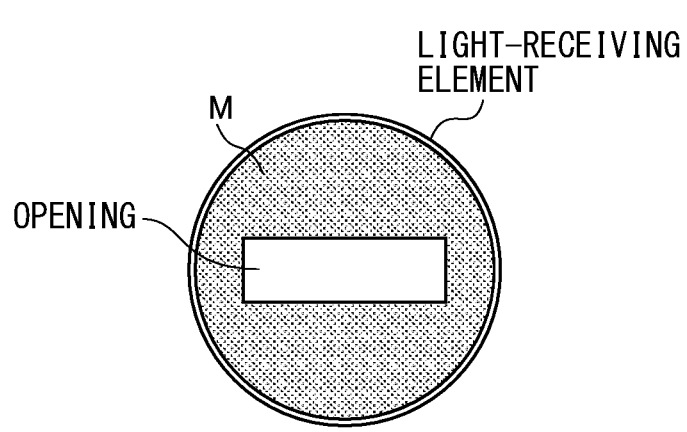
FIGS. 20A, 20B are views each illustrating a mask M provided in the light receiver 25.
Figure 20B:
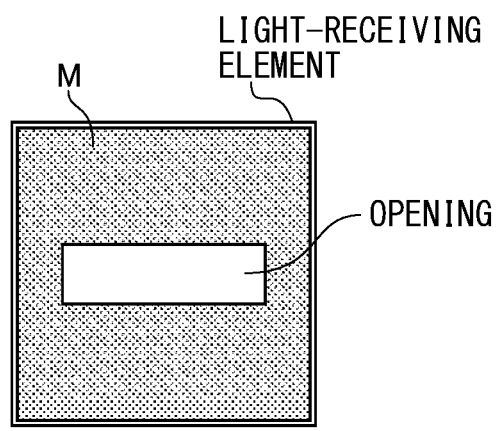

A light receivable area in a general light-receiving element has a circular shape or a square shape. When such a general light-receiving element is used as a light-receiving element of the light receiver 25, it is preferable to block the light entering in the region of the light receivable area except the reflected light-receiving area because such light becomes a noise. In this case, it is preferable to provide a mask including an opening so as to block the light entering in the region of the light receivable area of the light-receiving element except the reflected light-receiving area. FIG. 20A illustrates a circular light-receiving element provided with a mask M, and FIG. 20B illustrates a square light-receiving element provided with the mask M. In any case, the light passing through the opening of the mask M is received in the reflected light-receiving area.

In addition, a bandpass filter which transmits only the light reflected by the object may be provided in the opening of the mask M. For example, when the wavelength of the light emitted from the light source 21 is 905 nm, the noise can be further reduced by providing the bandpass filter which blocks the light in addition to the light having a wavelength of 905±40 nm.

A member having an opening may be provided between the light receiver 25 and the light-receiving lens 24 instead of the mask as long as the light toward the region in the light receivable area of the light-receiving element except the reflected light-receiving area is blocked.

Referring to FIG. 2, the main controller 40 determines whether or not the object is located in front of the vehicle 1 and obtains the size and shape of the object when the object is located in front of the vehicle 1 based on the object information stored in the memory 50. The main controller 40 also obtains a moving direction, a moving speed, and the like when the object moves. Such information is then displayed on the display 30.

The main controller 40 outputs alarm information to the sound and alarm generator 60 upon the determination of the risk of an accident.

Figure 21:
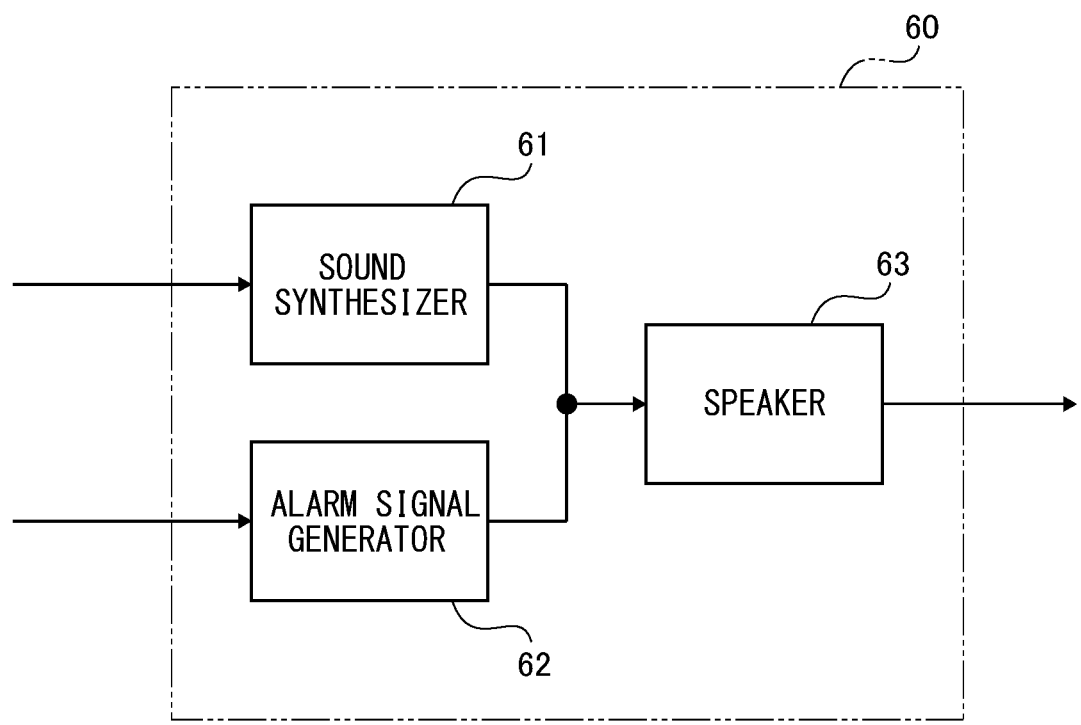
FIG. 21 is a block diagram illustrating a configuration of a sound and alarm generator.

The sound and alarm generator 60 includes a sound synthesizer 61, alarm signal generator 62, and speaker 63, as illustrated in FIG. 21 as one example.

The sound synthesizer 61 includes sound data, selects corresponding sound data upon the reception of the alarm information from the main controller 40, and outputs the selected sound data to the speaker 63.

The alarm signal generator 62 generates a corresponding alarm signal upon the reception of the alarm information from the main controller 40, and outputs the alarm signal to the speaker 63.

Meanwhile, in the reflection sensor disclosed in JP 3446466B, the number of measurement points in an up and down direction is determined based on the number of surfaces of the polygon mirror. For this reason, the reflection sensor has the small number of measurement points in an up and down direction. When scanning at a wide angle, the laser light cannot scan in the horizontal direction, and is curved.

In the laser radar disclosed in JP 2894055B, it is difficult to detect an object when a distance to the object is long because the laser light is diffused, and the energy density is decreased.

As described above, the processor in the object detector of the present invention is configured by the object information-obtaining unit 27 according to the present embodiment. A monitoring controller in the sensor of the present invention is configured by the main controller 40, the memory 50, and the sound and alarm generator 60.

As described above, the laser radar 20 according to the present embodiment includes the light source 21, light source driver 22, coupling lens 23, light-receiving lens 24, light receiver 25, light-receiving timing detection unit 26, and object information-obtaining unit 27.

The light source 21 includes a plurality of light emitter groups. Each light emitter group includes a plurality of light emitters. With this configuration, each light emitter group ensures the light volume according to the object position of the detection object. As a result, a distance to a detectable object can be increased.

A plurality of light emitter groups is arranged in matrix along the Y-axis direction (first direction) and the Z-axis direction (second direction). In this case, a desired detection region and detection resolution performance can be obtained in the Y-axis direction and Z-axis direction by adjusting the focal length of the coupling lens 23.

According to the laser radar 20 of the present embodiment, a distance to a detectable object can be increased, a detection region in an up and down direction (in this case, Z-axis direction) can be expanded, and a detection resolution performance in an up and down direction can be improved.

The object information-obtaining unit 27 sequentially lights on and lights off each of a plurality of light emitter groups with the light source driver 22, and obtains distance information to the object based on the lighting-on timing of the light emitter group and the light-receiving timing of the light-receiver 25 for each of the light emitter groups. Moreover, the object information-obtaining unit 27 obtains the positional information of the object based on the distance information to the object for each of the light emitter groups. In this case, the positional information of the object can be accurately obtained.

The laser radar 20 according to the present embodiment does not require a scanning mechanism such as a polygon mirror, so that a trouble less and reliable laser radar can be provided.

The monitor 10 according to the present embodiment includes the laser radar 20, so that the positional information of the object, the size of the object, the shape of the object, the moving direction of the object, the moving speed of the object, and the like can be accurately obtained.

In the above embodiment, the rectangular reflected light-receiving area in the light receiver 25 is described. However, the shape of the reflected light-receiving area can be a square shape by adjusting at least one of the focal length of the light-receiving lens 24 in the Z-axis direction and the focal length of the light-receiving lens 24 in the Y-axis direction. In this case, a general light-receiving element having a square light receivable area may be used as the light-receiving element of the light-receiver 25.

Figure 22A:
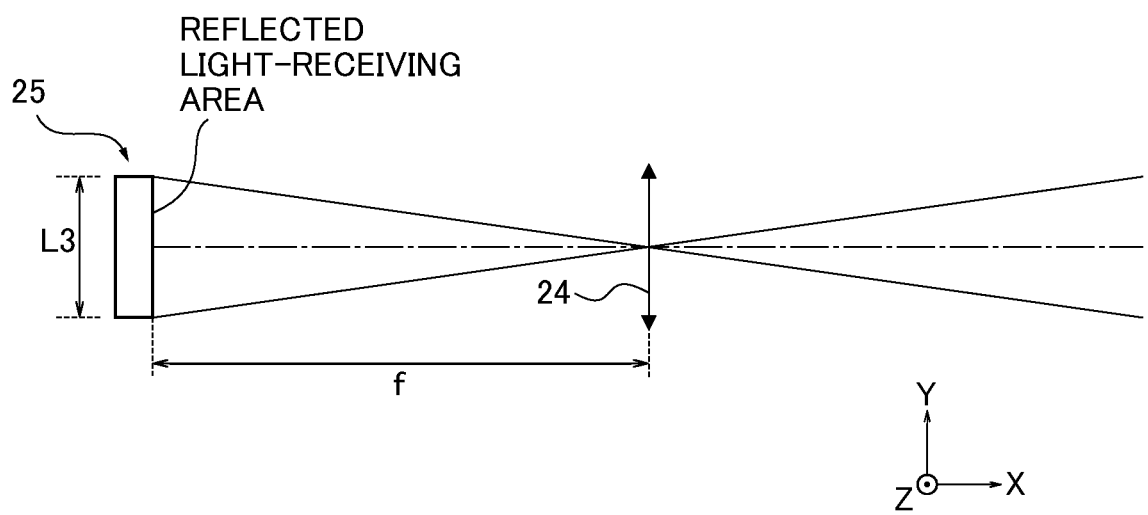
FIGS. 22A, 22B are views each illustrating the size of the light-receiving area of the light receiver 25 when a focal length of a light-receiving lens 24 is increased in the Z-axis direction.
Figure 22B:
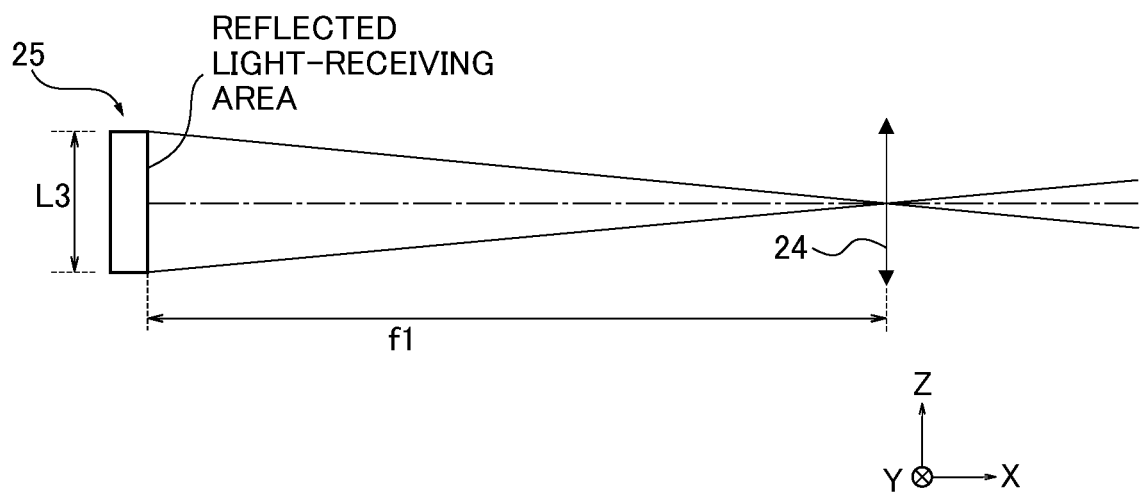

FIG. 22A and FIG. 22B illustrate an example when the focal length of the light-receiving lens 24 in the Z-axis direction is f1 longer than the focal length f in the Y-axis direction and the length of the reflected light-receiving area in the Z-axis direction is L3.

Figure 23A:
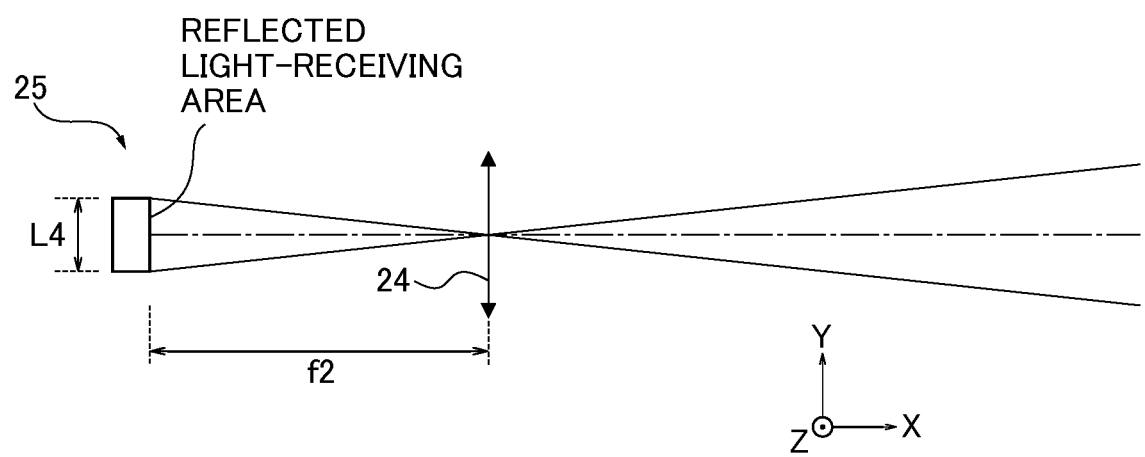
FIGS. 23A, 23B are views each illustrating the size of the light-receiving area of the light receiver 25 when a focal length of the light-receiving lens 24 is decreased in the Y-axis direction.
Figure 23B:
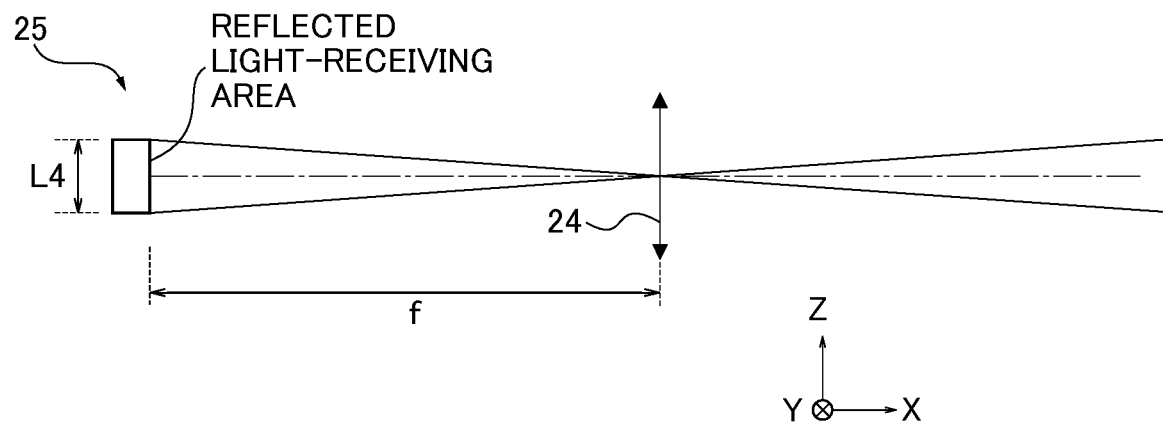

FIG. 23A and FIG. 23B illustrate an example when the focal length of the light-receiving lens 24 in the Y-axis direction is f2 shorter than the focal length f in the Z-axis direction and the length of the reflected light-receiving area in the Y-axis direction is L4.

Comparing the example illustrated in FIGS. 22A, 22B to the example illustrated in FIGS. 23A, 23B, the example illustrated in FIGS. 23A, 23B uses a light-receiving element smaller than that in the example illustrated in FIGS. 22A, 22B because the reflected light-receiving area is small. The costs can be therefore lowered, and the small light-receiving element is preferable because it is advantageous for a response performance and noise.

Figure 24:
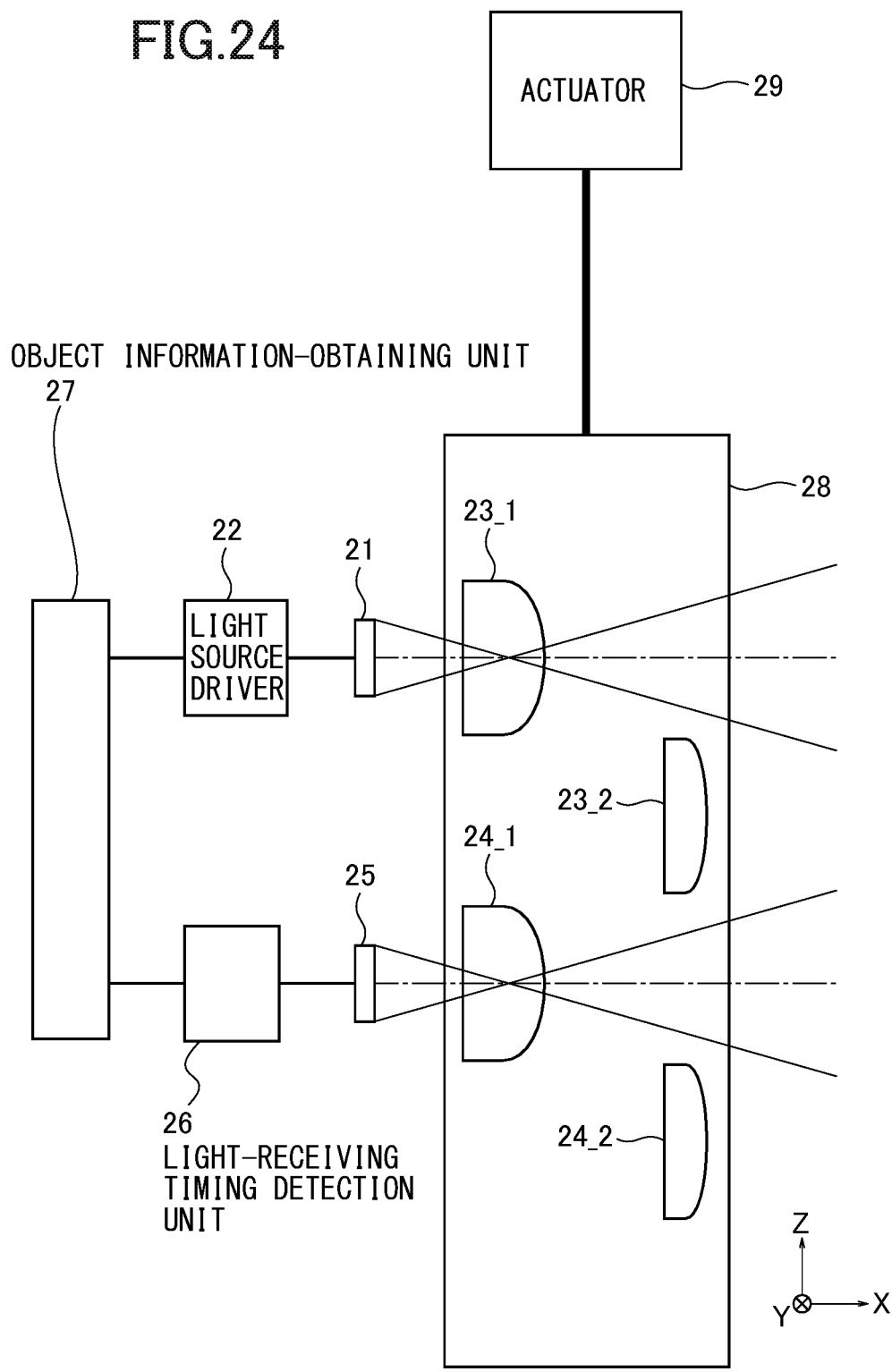
FIG. 24 is a view (part 1) illustrating an example including two coupling lenses (23_1, 23_2) each having a different focal length instead of the coupling lens 23, and two light-receiving lenses (24_1, 24_2) each having a different focal length instead of the light-receiving lens 24.
Figure 25:
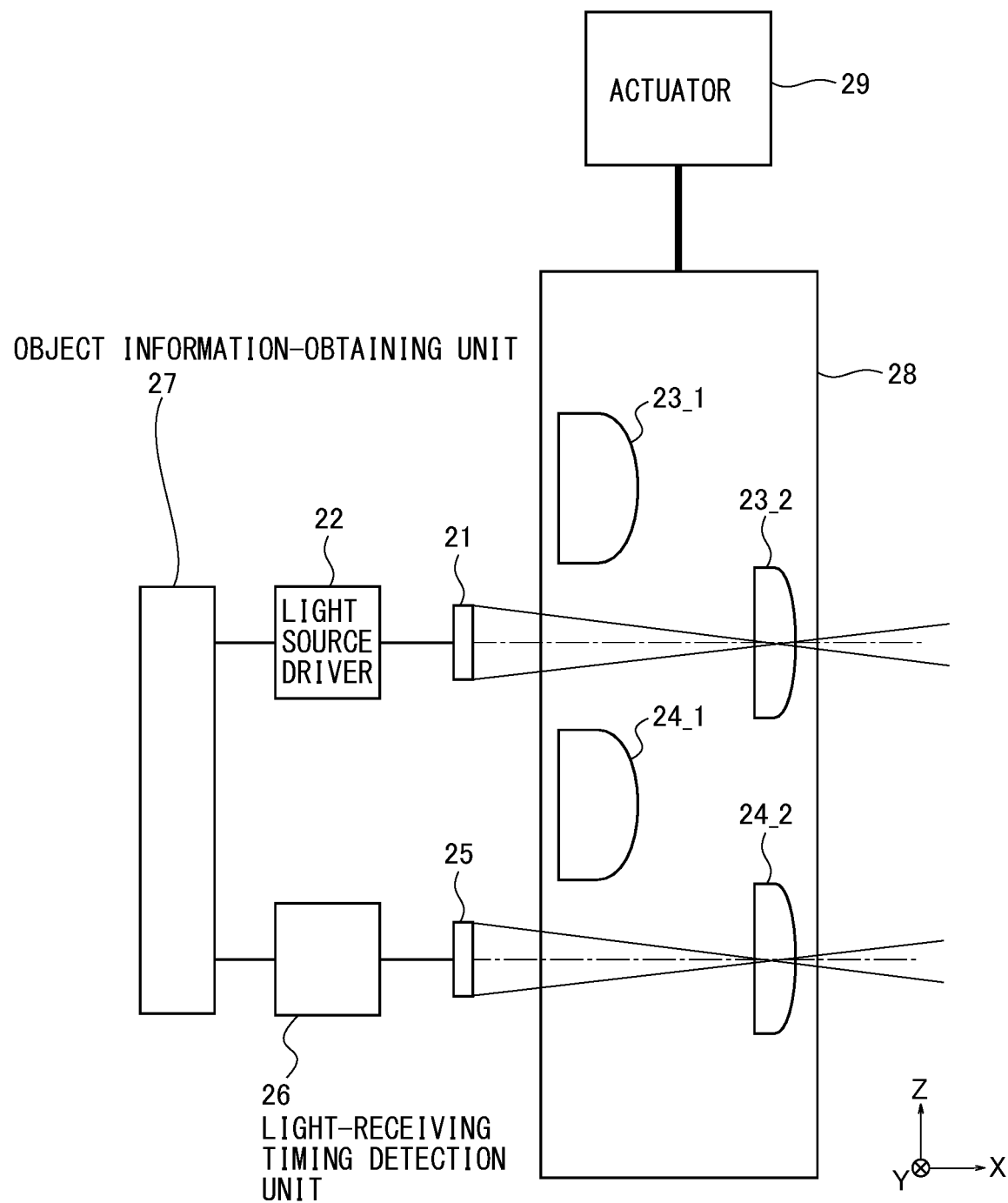
FIG. 25 is a view (part 2) illustrating an example including two coupling lenses (23_1, 23_2) each having a different focal length instead of the coupling lens 23, and two light-receiving lenses (24_1, 24_2) each having a different focal length instead of the light-receiving lens 24.

In the above embodiment, as illustrated in FIGS. 24, 25 as one example, a coupling lens 23_1 and a coupling lens 23_2 may be used instead of the coupling lens 23, and a light-receiving lens 24_1 and a light-receiving lens 24_2 may be used instead of the light-receiving lens 24. In this case, the example illustrated in FIGS. 24, 25 includes a holder 28 which holds each lens and an actuator 29 which moves the holder 28 in the Z-axis direction. The actuator 29 is controlled by the light source driver 22.

For example, the coupling lens 23_1 and the light-receiving lens 24_1 are a short focus lens (for example, 6 mm), and the coupling lens 23_2 and the light-receiving lens 24_2 are a long focus lens (for example, 50 nm).

The coupling lens 23_1 and the light-receiving lens 24_1 are used as a pair, and the coupling lens 23_2 and the light-receiving lens 24_2 are used as a pair. Each lens is held by the holder 28.

As illustrated in FIG. 24, when the actuator 29 is controlled such that the coupling lens 23_1 is located on +X side of the light source 21, and the light-receiving lens 24_1 is located on +X side of the light-receiver 25, a wide detection region can be obtained. On the other hand, as illustrated in FIG. 25, when the actuator 29 is controlled such that the coupling lens 23_2 is located on +X side of the light source 21 and the light-receiving lens 24_2 is located on +X side of the light receiver 25, a high detection resolution performance can be achieved. Namely, the configuration for the wide detection region and the configuration for the high detection resolution performance can be switched.

In this case, the focal length of the coupling lens and the focal length of the light-receiving lens which are used simultaneously may differ.

While the focal length of the light-receiving lens may be constant, the focal length of the coupling lens may be only changed.

A coupling lens system including a zooming function may be used instead of the coupling lens 23. In this case, the configuration for the wide detection region and the configuration for the high detection resolution performance can be switched. For example, the configuration for the wide detection region can be used in an urban location and the configuration for the high detection resolution performance can be used in a high way. In this case, an urban location or a high way can be determined by a sensor provided outside, and the focal length of the coupling lens system is changed by a driving mechanism such as an actuator.

Figure 26A:
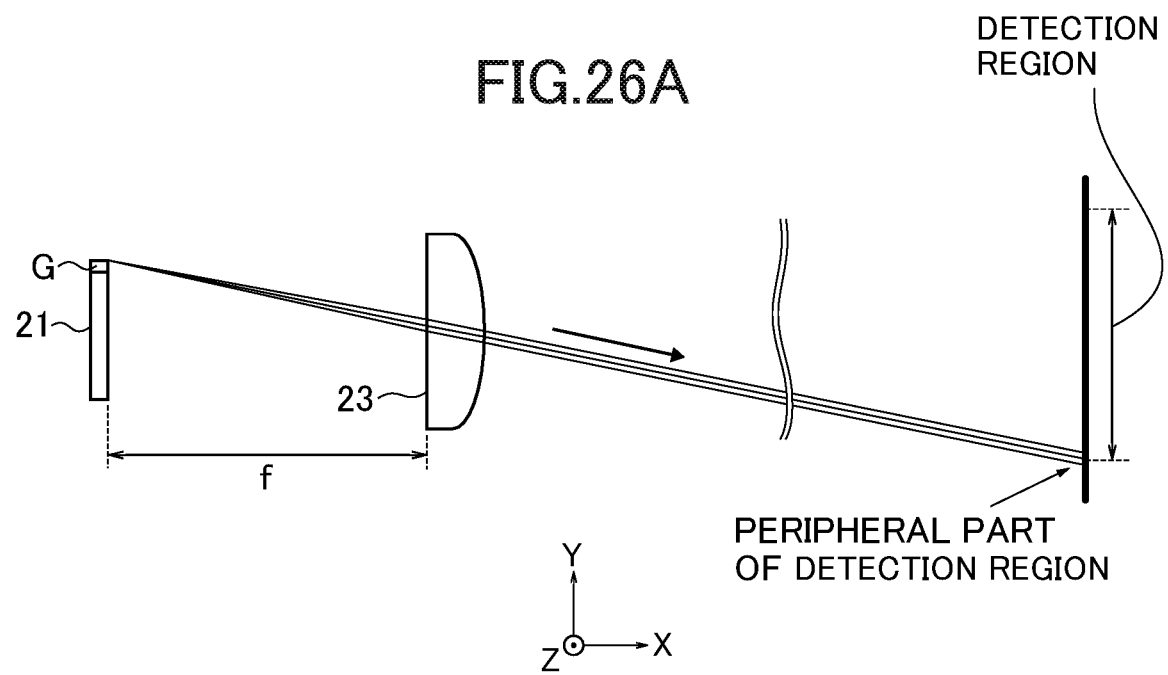
FIG. 26A is a view illustrating light toward a peripheral part of the detection region.
Figure 26B:
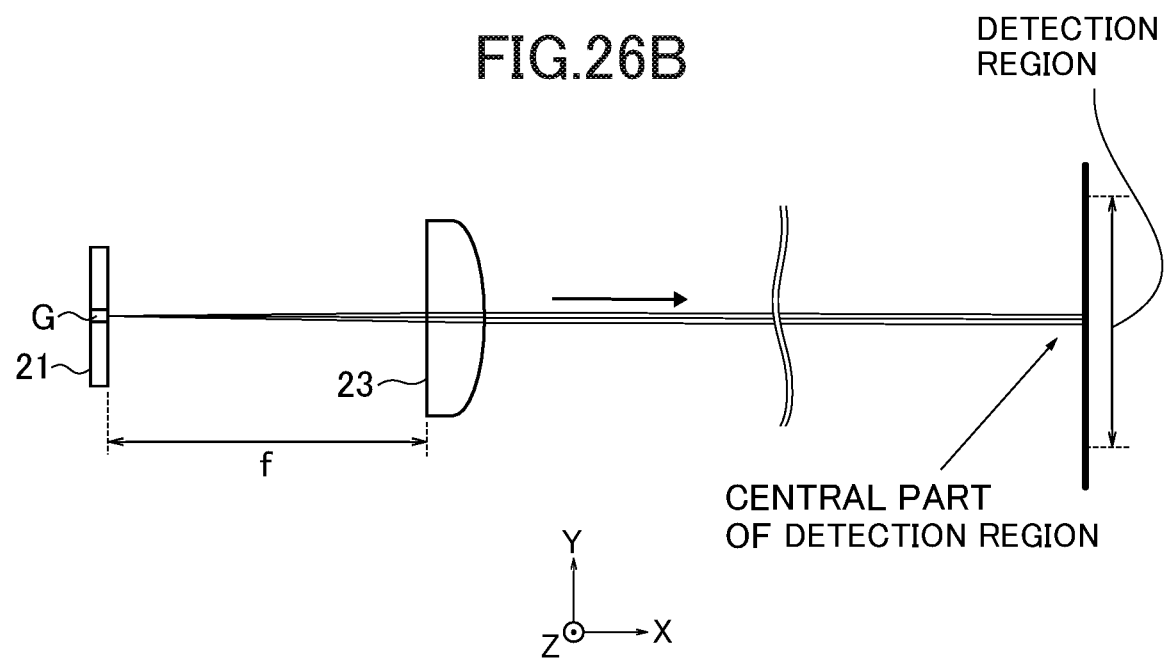
FIG. 26B is a view illustrating light toward a central part of the detection region.
Figure 27A:
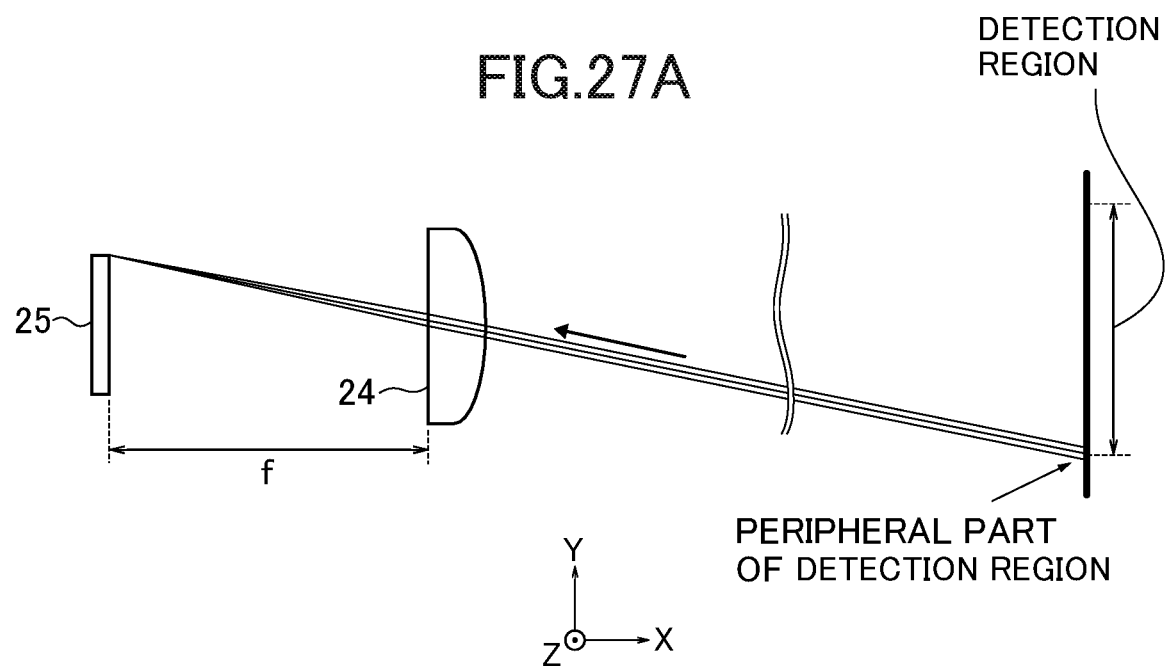
FIG. 27A is a view illustrating light from the peripheral part of the detection region.
Figure 27B:
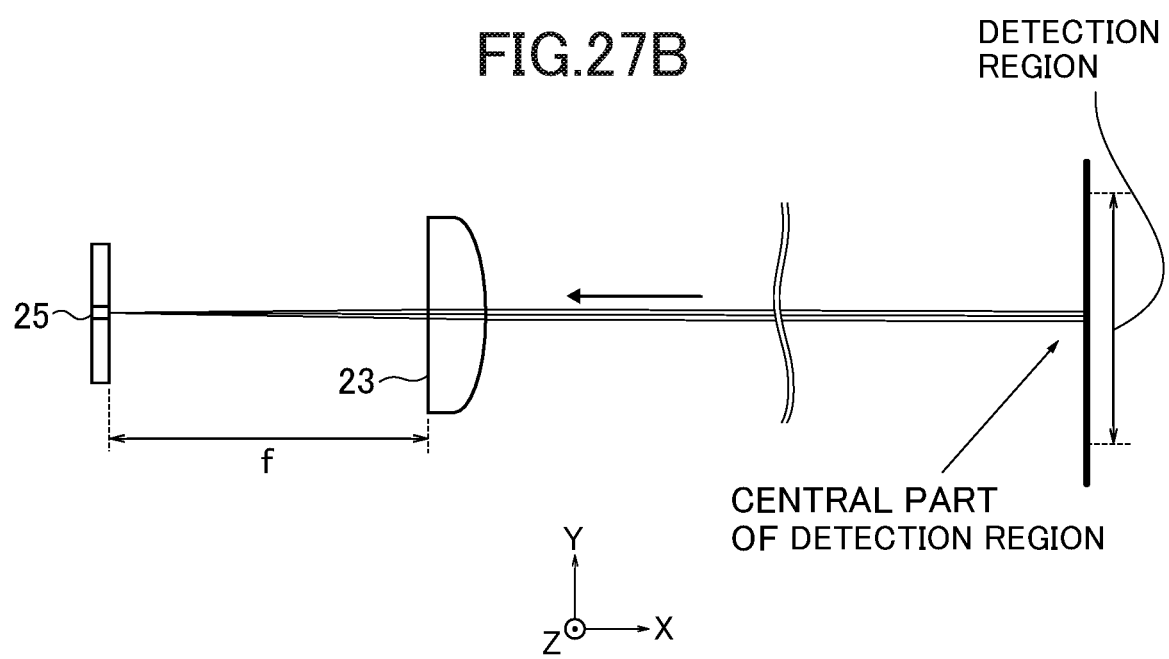
FIG. 27B is a view illustrating light from the central part of the detection region.
Figure 28:
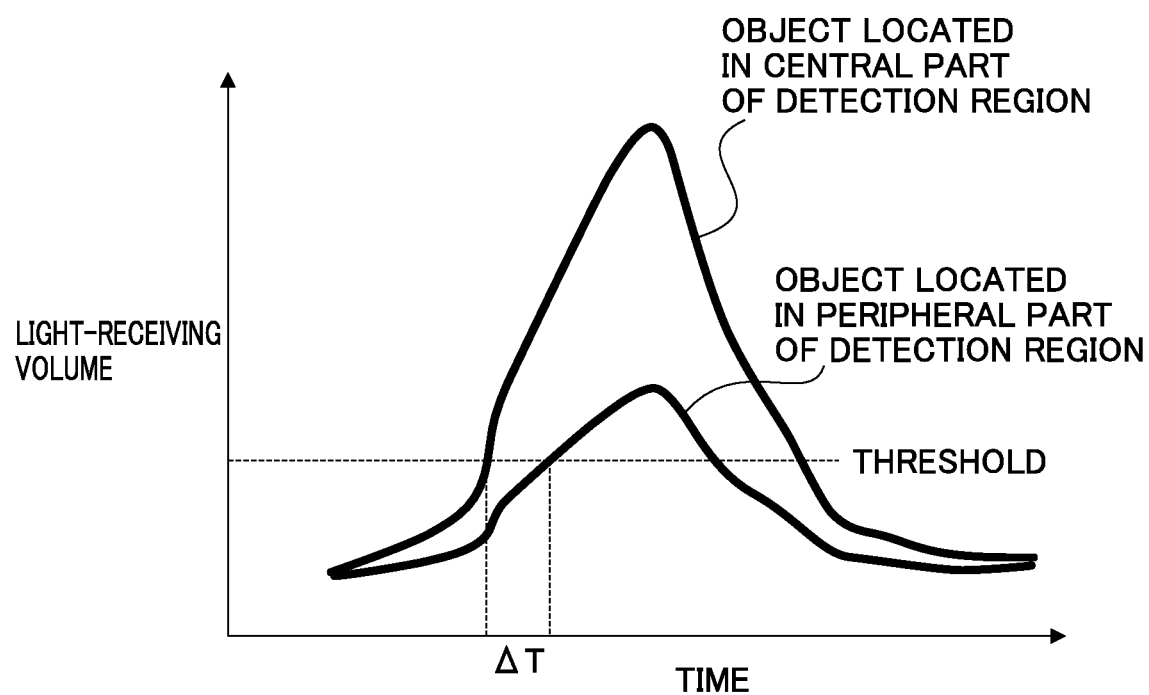
FIG. 28 is a view illustrating a difference between an object located in the central part of the detection region and an object located in the peripheral part of the detection region.

When the coupling lens 23 includes vignetting, the volume of the light (refer to FIG. 26A) emitted from the laser radar 20 toward the peripheral part of the detection region may be smaller than the volume of the light (refer to FIG. 26B) emitted toward the central part of the detection region. Moreover, when the light-receiving lens 24 includes vignetting, the light-receiving volume when the light incident on the laser radar 20 is light (refer to FIG. 27A) from the peripheral part of the detection region may be smaller than the light-receiving volume when the light incident on the laser radar 20 is light from the central part of the detection region. In this case, as illustrated in FIG. 28 as an example, the timing in which the light-receiving volume exceeds a threshold may differ between the object located in the central part of the detection region and the object located in the peripheral part of the detection region even though the objects are located in the same distance. Such a timing difference causes a detection error of light-receiving timing in the light-receiving timing detection unit 26, resulting in a measurement error of a distance to an object and a measurement error of an object shape.

When a detection error of the light-receiving time has a negative effect on the detection result, the emission light volume of a plurality of light emitter groups may be adjusted for each of the light emitter groups such that the light-receiving volume becomes substantially the same regardless of the position in the detection region as long as the distance to the object is the same.

For example, the emission light volume of the light emitter groups can be adjusted such that the ratio between the emission light volume of the light emitter group for use when the light moves to the peripheral part of the detection region and the emission light volume of the light emitter group for use when the light moves to the central part of the detection region becomes 2:1.

In this case, all of the light emitters (in this case, 12560) may be lighted on in the light emitter group for use when the light moves to the peripheral part of the detection region, the half of the light emitters (in this case, 6280) may be lighted on in the light emitter group for use when the light moves to the central part of the detection region, and the intermediate number of light emitters may be lighted on in the light emitter group between these light emitter groups. Moreover, the driving current of the light emitter group for use when the light moves to the peripheral part of the detection region may be set to twice the driving current of the light emitter group for use when the light moves to the central part of the detection region, and the driving current of the light emitter group between these light emitter groups may be intermediate driving current between these driving current.

In this case, even though the distance to the object is short, the saturation of the light receiver 25 due to the excessive light-receiving volume can be controlled, so that a time until next detection can be shortened.

The volume of the reflected light from the object is inversely proportional to the square of the distance to the object. For example, the volume of the reflected light when the distance to the object is 40 m is four times the light volume of the reflected light when the distance to the object is 80 m. Such a difference in light volume causes a detection error of the light-receiving timing similar to the above. As a result, the measurement error of the distance to the object and the measurement error of the object shape may be caused.

When a detection error of the light-receiving timing has a negative effect on the detection result, the emission light volume of the light emitter groups may be adjusted such that the light-receiving volume becomes the same regardless of the distance to the object.

For example, preliminary detection is most recently performed, then, the distance to the object is generally estimated from the detection result, and the emission light volume of the light emitter groups is adjusted based on the estimated result.

In this case, for example, when the estimated distance to the object is 200 m, all of the light emitters (in this case, 12560) may be lighted on. When the estimated distance to the object is 100 m, ¼ times the light emitters (in this case, 3140) may be lighted on. The driving current when the estimated distance to the object is about 100 m may be ¼ times the driving current when the estimated distance to the object is 200 m.

In this case, even though the distance to the object is short, the saturation of the light receiver 25 due to the excessive light volume can be controlled, and a time until next detection can be shortened.

Figure 29:
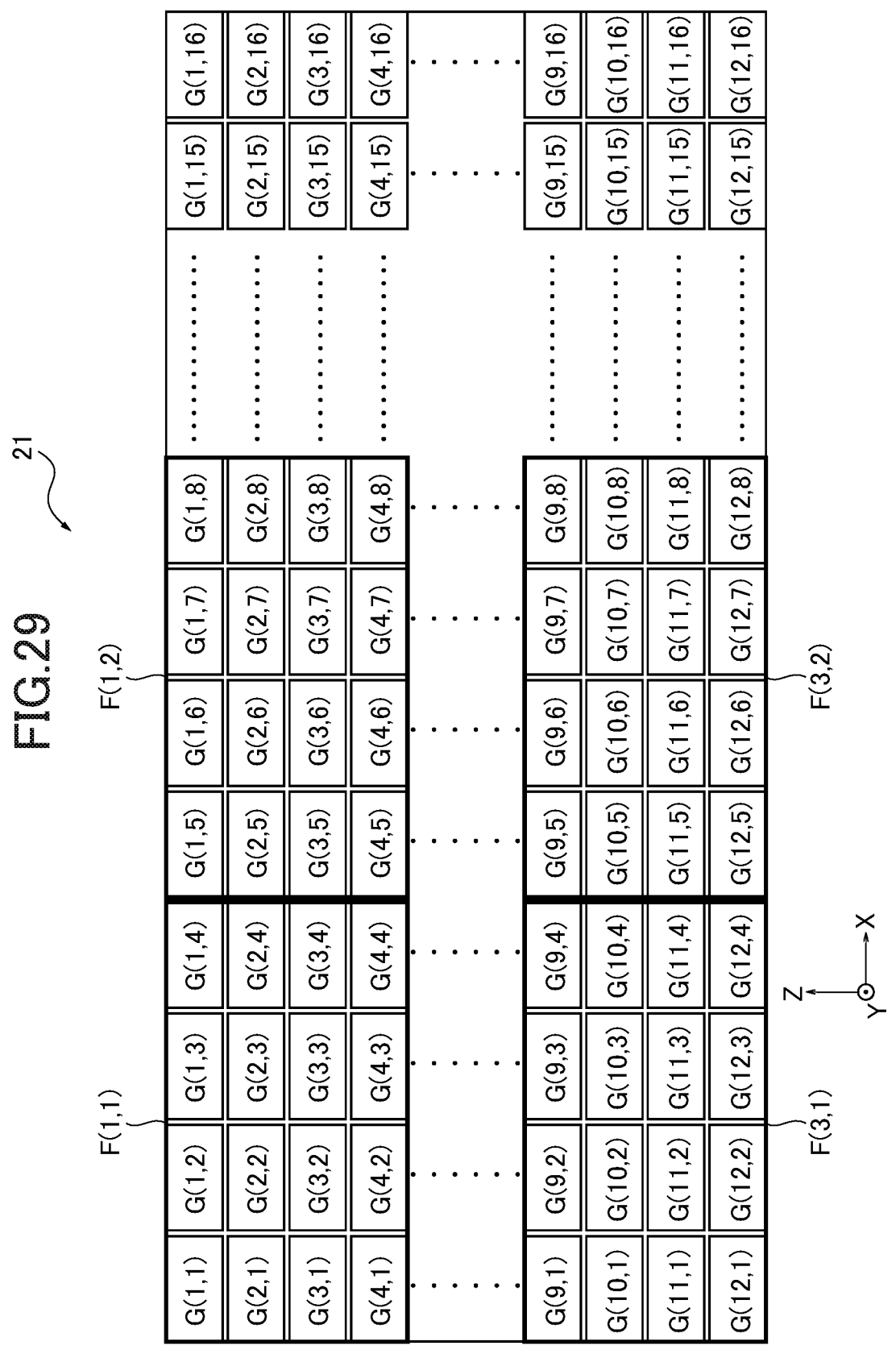

In the above embodiment, an assembly including two or more light emitter groups may be an assembly light emitter group F (k, m). For example, one assembly light emitter group including adjacent 16 light emitter groups is illustrated in FIG. 29. In this case, F (1, 1) includes G (1, 1), G (1, 2), G (1, 3), G (1, 4), G (2, 1), G (2, 2), G (2, 3), G (2, 4), G (3, 1), G (3, 2), G (3, 3), G (3, 4), G (4, 1), G (4, 2), G (4, 3), and G (4, 4). F (3, 1) includes G (9, 1), G (9, 2), G (9, 3), G (9, 4), G (10, 1), G (10, 2), G (10, 3), G (10, 4), G (11, 1), G (11, 2), G (11, 3), G (11, 4), G (12, 1), G (12, 2), G (12, 3), and G (12, 4).

Figure 30:
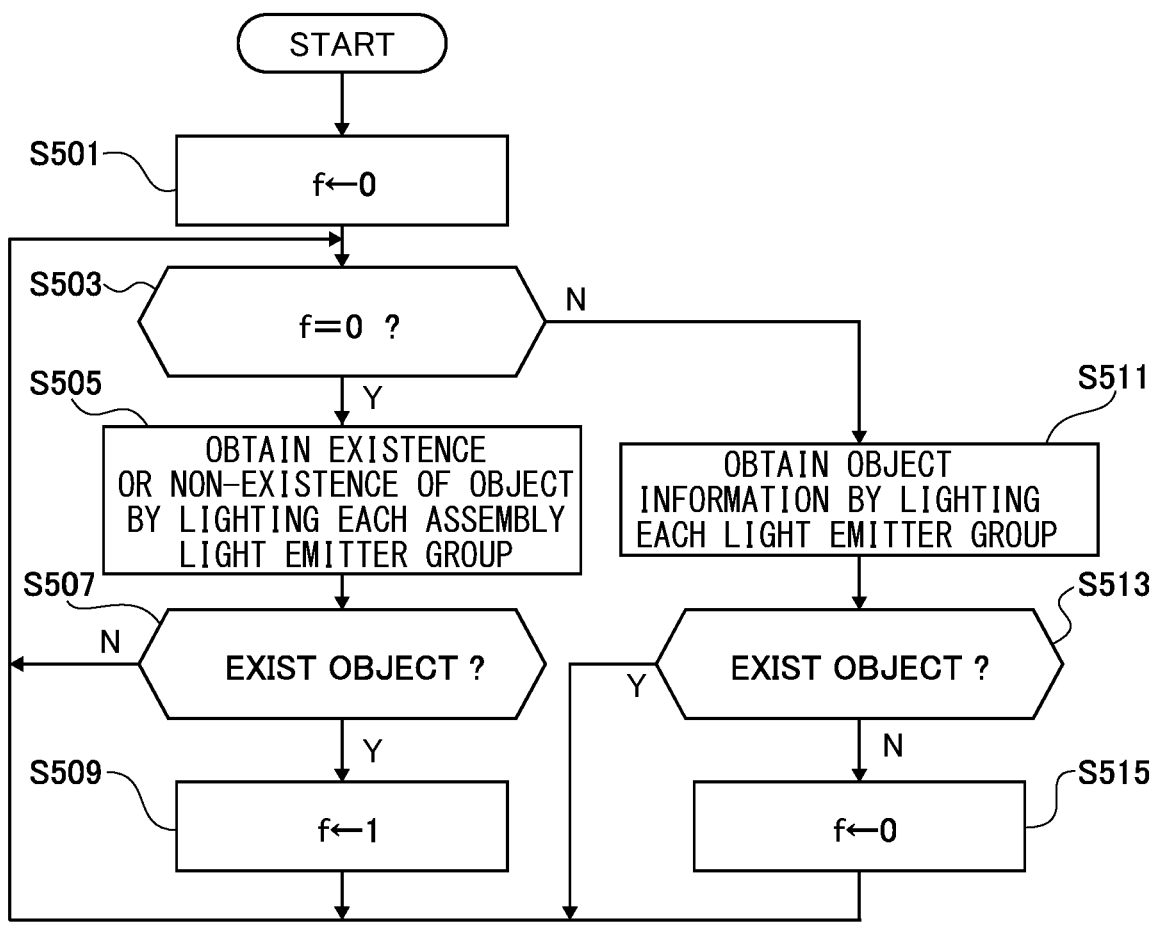
FIG. 30 is a flowchart illustrating a modified example of a performance of an object information-obtaining unit.

In this case, in the object information-obtaining process, as illustrated in FIG. 30, each of the assembly light emitter groups is lighted on until the existence of the object is determined. After the determination of the existence of the object, each of the light emitter groups may be lighted on in next detection timing. The process time without an object can be therefore shortened.

Upon the switching on of the power source, the flag f showing the existence or non-existence of the object is set to an initial value 0 in the first Step S501.

In the next Step S503, it is determined whether or not the value of the flag f is 0. When the value of the flag f is 0 (YES in S503), the process moves to Step S505.

In Step S505, each of the assembly light emitter groups is lighted on, and the existence or non-existence information of the object is obtained.

In the next Step S507, the existence of the object is determined. When the existence of the object is determined (YES in S507), the process moves to Step S509. On the other hand, when there is no object (NO in S507), the process returns to Step S503.

In Step S509, the flag f is set to 1. Then, the process returns to Step S503.

In step S503, when the value of the flag f is not 0 (NO in S503), the process moves to step S511.

In Step S511, as illustrated in FIG. 11, each of light emitter groups is lighted on, and the object information is obtained.

In the next Step S513, the existence of the object is determined. When the existence of the object is determined (YES in S513), the process returns to Step S503. On the other hand, when there is no object (NO in S513), the process moves to Step S515.

In Step S515, the flag f is set to 0. Then, the process returns to Step S503.

Figure 31:
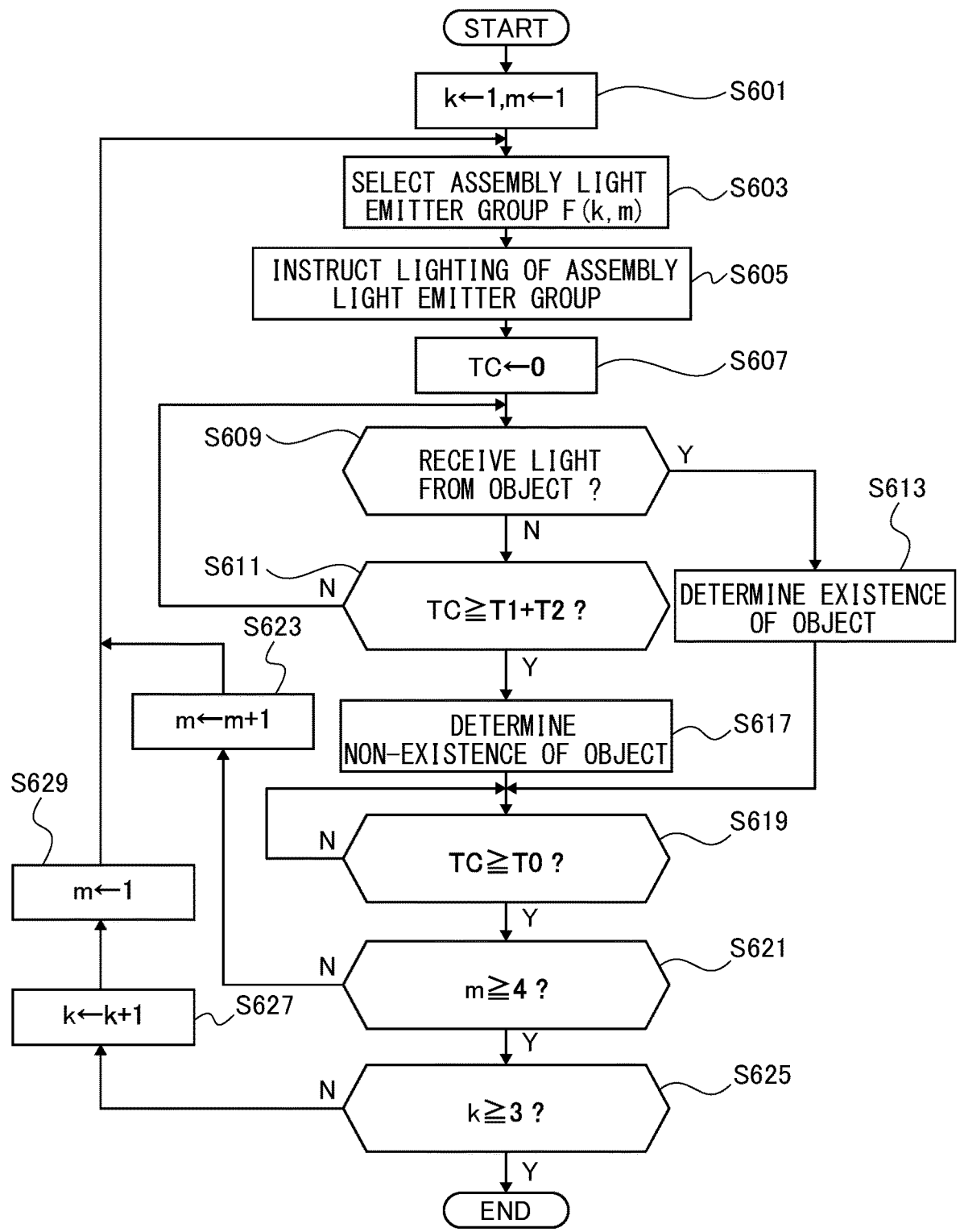
FIG. 31 is a flowchart illustrating details of Step S505 in FIG. 30.

FIG. 31 illustrates the details of the process in Step S505.

In the first Step S601, the valuable numbers k, m, which specify the assembly light emitter group, are set to the initial value 1.

In the next Step S603, the assembly light emitter group F (k, m) is selected.

In the next Step S605, the lighting of the selected assembly light emitter group F (k, m) is instructed to the light source driver 22. The light source driver 22 thereby simultaneously lights on all of the light emitters in the assembly light emitter group F (k, m) for a predetermined time T1 (refer to FIG. 12).

In the next Step S607, the timer counter TC is reset to 0.

In the next Step S609, it is determined whether or not the light reflected by the object is received by the light receiver 25 based on the light-receiving timing signal from the light-receiving timing detection unit 26. When the light receiver 25 does not receive the light (NO in S609), the process moves to Step S611.

In Step S611, it is determined whether or not the value of the timer counter TC is equal to a value corresponding to T1+T2 (refer to FIG. 12) or more. In this case, T2 is 1.3 μsec, as one example. When there is no interruption at the time that the value of the timer counter TC reaches a value corresponding to T1+T2 from the interruption controller (NO in S611), the process returns to Step S609.

In Step S609, when the light receiver 25 receives light (YES in S609), the process moves to Step S613.

In Step S613, the existence of the object is determined. Then, the object existence information is stored in a not-shown memory of the object information-obtaining unit 27, and the process moves to Step S619.

In Step S611, when there is the interruption at the time that the value of the timer counter TC reaches a value corresponding to T1+T2 from the interruption controller (YES in S611), the process moves to Step S617.

In the next Step S617, the non-existence of the object is determined. The non-existence object information is stored in a not-shown memory of the object information-obtaining unit 27.

In Step S619, it is determined whether or not the value of the timer counter TC is equal to a value corresponding to the time T0 (refer to FIG. 12) or not. When there is no interruption at the time that the value of the timer counter TC reaches a value corresponding to T0 from the interruption controller (NO in S619), the process waits for the interruption. When there is the interruption (YES in S619), the process moves to Step S621.

In Step S621, it is determined whether or not the value of the valuable number m is equal to 4 or more. When the value of the valuable number m is less than 4 (NO in S621), the process moves to Step S623.

In Step S623, 1 is added to the value of the valuable number m, and the process returns to Step S603.

After that, the processes in Steps S603 to S623 are repeated until it is determined that the value of the valuable number m reaches equal to 4 or more.

When the value of the valuable number m is equal to 4 or more (YES in S621), the process moves to Step S625.

In Step S625, it is determined whether or not the value of the variable number k is equal to 3 or more. When the value of the variable number k is less than 3 (No in S625), the process moves to Step S627.

In Step S627, 1 is added to the value of the variable number k.

In the next Step S629, the value of the variable number m is returned to the initial value 1, and the process returns to Step S603.

After that, the processes in Steps S603 to S629 are repeated until it is determined that the value of the variable number k reaches equal to 3 or more.

When the value of the variable number k is equal to 3 or more, the process in Step S505 is completed.

When the light emitter group is lighted on, a temperature of the peripheral part of the light emitter group is increased. When the adjacent light emitter groups are sequentially lighted on, the emission light volume may be decreased even though the driving current is the same.

When a decrease in emission light volume has a negative effect on the detection result, the light emitter group at least one light emitter group away from the previously lighted-on light emitter group may be lighted on.

In this case, the even-numbered light emitter groups G (1, 2), G (1, 4), G (1, 6) . . . G (1, 16) may be lighted on after the odd-numbered light emitter groups G (1, 1), G (1, 3), G (1, 5) . . . G (1, 15) are lighted on. In addition, the lighting order includes various orders.

A rotation mechanism which rotates the laser radar 20 about Z-axis may be provided in the above embodiment.

In the above embodiment, 157 light emitters are arranged along the Y-axis direction, and 80 light emitters are arranged along the Z-axis direction in each light emitter group G. However, the present invention is not limited the above embodiment.

In the above embodiment, each light emitter group G includes 12560 light emitters. However, the present invention is not limited the above embodiment.

In the above embodiment, the light output of one light emitter is 2 mW.

However, the present invention is not limited the above embodiment.

In the above embodiment, the light output of one light emitter group G is about 25 W. However, the present invention is not limited to the above embodiment.

In the above embodiment, the diameter ds of one emitter is 1 μm, the distance D1 between two light emitters adjacent to each other in the Y-axis direction is 1 μm, and the distance D2 between two light emitters adjacent to each other in the Z-axis direction is 1 μm. However, the present invention is not limited the above embodiment.

In the above embodiment, the length L1 of one light emitter group G in the Y-axis direction is 313 μm, and the length L2 of one light emitter group G in the Z-axis direction is 159 μm. However, the present invention is not limited the above embodiment.

In the above embodiment, 16 light emitter groups G are arranged along the Y-axis direction and 12 light emitter groups G are arranged along the Z-axis direction in the light source 21. However, the present invention is not limited the above embodiment.

In the above embodiment, the light source 21 includes 192 light emitter groups G. However, the present invention is not limited the above embodiment.

In the above embodiment, T1=0.02 μsec. However, the present invention is not limited the above embodiment.

In the above embodiment, T0=104 μsec. However, the present invention is not limited the above embodiment.

In the above embodiment, the object information-obtaining process is repeated once in 20 msec. However, the present invention is not limited the above embodiment. For example, the execution interval of the object information-obtaining process may differ according to a moving speed of a vehicle.

In the above embodiment, the main controller 40 may execute a part of the process in the object information-obtaining unit 27, and the object information-obtaining unit 27 may execute a part of the process in the main controller 40.

In the above embodiment, the monitor 10 includes one laser radar 20. However, the present invention is not limited the above embodiment. The monitor 10 may include a plurality of laser radars 20 according to the size of a vehicle, a monitoring area, and the like.

In the above embodiment, the laser radar 20 is used for the monitor 10 which monitors the traveling direction (forward) of the vehicle. However, the present invention is not limited the above embodiment. The laser radar 20 may be used for a device which monitors a back or a side of a vehicle.

The laser radar 20 can be used for a sensor in addition to a sensor mounted on a vehicle. In this case, the main controller 40 outputs alarm information according to a purpose of sensing.

The laser radar 20 can be used for a different purpose (for example, measurement device) other than a sensor.

According to the object detector of the present embodiment, a distance to a detectable object can be increased, a detection region in an up and direction can be expanded, and a detection resolution performance in an up and down direction can be improved.

In addition, although the embodiment of the present invention has been described above, the present invention is not limited thereto. It should be appreciated that variations may be made in the embodiment described by persons skilled in the art without departing from the scope of the present invention.

What is claimed is:

1. An object detector, comprising:
a projector including a light source having a two-dimensionally arranged plurality of light emitter groups, each of the light emitter groups having a plurality of light emitters;
a light receiver which receives light emitted from the projector, and reflected by an object; and
a light source driver which lights on and lights off each of the light emitter groups of the light source, wherein
the light receiver includes a single light-receiving element, and
a size of a light-receiving area is the same as a size of an emission area when the plurality of light emitter groups in the light source are simultaneously lighted on.

2. The object detector according to claim 1, further comprising: a processor which independently and sequentially lights on and lights off the plurality of light emitter groups with the light source driver, and obtains distance information to the object based on lighting-on timing of the light emitter group and light-receiving timing of the light receiver when the light receiver receives light reflected by the object.

3. The object detector according to claim 2, wherein the processor simultaneously lights on and lights off at least two light emitter groups among the plurality of light emitter groups until the light receiver receives the light reflected by the object.

4. The object detector according to claim 2, wherein the processor adjusts emission light volume of the light emitter group based on the distance information to the object.

5. The object detector according to claim 2, wherein the processor adjusts a number of light emitters to be lighted on in the light emitter group based on the distance information to the object.

6. The object detector according to claim 2, wherein the processor adjusts driving current to the light emitter group based on the distance information to the object.

7. The object detector according to claim 2, wherein the processor sequentially lights on the light emitter group at least one light emitter group away from a previously lighted-on light emitter group.

8. The object detector according to claim 1, wherein
the projector includes a projection optical system disposed on an optical path of light emitted from the light source, and
a focal length of the projection optical system is variable.

9. The object detector according to claim 1, wherein the light receiver includes a bandpass filter which transmits only the light reflected by the object.

10. A sensor, comprising:
the object detector according to claim 1; and
a monitoring controller which obtains moving information including at least one of existence or non-existence of movement, a moving direction, and a moving speed of the object based on output of the object detector.

11. An object detector, comprising:
a projector including a light source having a two-dimensionally arranged plurality of light emitter groups, each of the light emitter groups having a plurality of light emitters;
a light receiver which receives light emitted from the projector, and reflected by an object; and
a light source driver which lights on and lights off each of the light emitter groups of the light source, wherein
the plurality of light emitter groups is disposed along a first direction and a second direction orthogonal to each other,
the light receiver includes a light-receiving optical system which collects the light reflected by the object, and
the light-receiving optical system has a focal length which differs between the first direction and the second direction.

12. The object detector according to claim 11, comprising: a processor which independently and sequentially lights on and lights off the plurality of light emitter groups with the light source driver, and obtains distance information to the object based on lighting-on timing of the light emitter group and light-receiving timing of the light receiver when the light receiver receives light reflected by the object.

13. The object detector according to claim 12, wherein the processor simultaneously lights on and lights off at least two light emitter groups among the plurality of light emitter groups until the light receiver receives the light reflected by the object.

14. The object detector according to claim 12, wherein the processor adjusts emission light volume of the light emitter group based on the distance information to the object.

15. The object detector according to claim 12, wherein the processor adjusts a number of light emitters to be lighted on in the light emitter group based on the distance information to the object.

16. The object detector according to claim 12, wherein the processor adjusts driving current to the light emitter group based on the distance information to the object.

17. The object detector according to claim 12, wherein the processor sequentially lights on the light emitter group at least one light emitter group away from a previously lighted-on light emitter group.

18. The object detector according to claim 11, wherein
the projector includes a projection optical system disposed on an optical path of light emitted from the light source, and
a focal length of the projection optical system is variable.

19. The object detector according to claim 11, wherein
a size of a sectional shape of light toward the object in the first direction is larger than a size of a sectional shape of light toward the object in the second direction when the plurality of light emitter groups is simultaneously lighted on, and
a focal distance of the light-receiving optical system in the first direction is shorter than a focal distance of the light-receiving optical system in the second direction.

20. A sensor, comprising:
the object detector according to claim 11; and
a monitoring controller which obtains moving information including at least one of existence or non-existence of movement, a moving direction, and a moving speed of the object based on output of the object detector.

\* \* \* \* \*